(12) United States Patent
Chen et al.

(10) Patent No.: US 11,178,635 B2
(45) Date of Patent: Nov. 16, 2021

(54) COMMUNICATION SYSTEM

(71) Applicant: NEC CORPORATION, Tokyo (JP)

(72) Inventors: Yuhua Chen, Tokyo (JP); Sadafuku Hayashi, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 192 days.

(21) Appl. No.: 16/338,359

(22) PCT Filed: Sep. 13, 2017

(86) PCT No.: PCT/JP2017/032997
§ 371 (c)(1),
(2) Date: Mar. 29, 2019

(87) PCT Pub. No.: WO2018/061766
PCT Pub. Date: Apr. 5, 2018

(65) Prior Publication Data
US 2019/0223147 A1    Jul. 18, 2019

(30) Foreign Application Priority Data

Sep. 30, 2016 (GB) .................... 1616732

(51) Int. Cl.
*H04W 68/00* (2009.01)
*H04W 76/28* (2018.01)
(Continued)

(52) U.S. Cl.
CPC ......... *H04W 68/005* (2013.01); *H04W 4/029* (2018.02); *H04W 8/08* (2013.01); *H04W 68/02* (2013.01); *H04W 76/28* (2018.02)

(58) Field of Classification Search
CPC ... H04W 4/029; H04W 4/70; H04W 52/0216; H04W 68/005; H04W 68/02; H04W 76/28; H04W 8/08
(Continued)

(56) References Cited

U.S. PATENT DOCUMENTS 10,736,171 B2 * 8/2020 Lee .................. H04W 52/0216
2015/0319734 A1 * 11/2015 Zhang ................. H04W 68/005
455/458

(Continued)

FOREIGN PATENT DOCUMENTS

EP   2 903 333 A1   8/2015
GB   2514117 A      11/2014
(Continued)

OTHER PUBLICATIONS

Communication dated Aug. 11, 2020, from the Japanese Patent Office in application No. 2019-516011.
(Continued)

*Primary Examiner* — Gbemileke J Onamuti
(74) *Attorney, Agent, or Firm* — Sughrue Mion, PLLC

(57) ABSTRACT

A communication system is disclosed in which an MME receives an indication that a base station of a tracking area supports extended discontinuous reception, eDRX. The MME determines that paging is required for a communication device and that the communication device may be located in a cell of a base station of the tracking area. The MME triggers paging of the communication device in accordance with discontinuous reception, DRX, information that is not specific to eDRX via base stations that support eDRX and triggered paging of the communication device in accordance with eDRX specific information via base stations which support eDRX has been received.

23 Claims, 12 Drawing Sheets

(51) Int. Cl.
*H04W 8/08* (2009.01)
*H04W 68/02* (2009.01)
*H04W 4/029* (2018.01)

(58) Field of Classification Search
USPC ........................................................ 370/329
See application file for complete search history.

(56) References Cited

U.S. PATENT DOCUMENTS

| | | | | |
|---|---|---|---|---|
| 2016/0345292 | A1* | 11/2016 | Ljung | H04W 36/0083 |
| 2016/0345293 | A1* | 11/2016 | Diachina | H04W 4/70 |
| 2017/0048842 | A1* | 2/2017 | Han | H04W 52/0216 |
| 2018/0014275 | A1* | 1/2018 | Fujishiro | H04W 68/02 |
| 2018/0092158 | A1* | 3/2018 | Lee | H04W 36/24 |
| 2018/0176883 | A1* | 6/2018 | Fujishiro | H04W 52/0206 |

FOREIGN PATENT DOCUMENTS

| | | |
|---|---|---|
| WO | 2014/158268 A1 | 10/2014 |
| WO | 2015/188880 A1 | 12/2015 |
| WO | 2016/140275 A1 | 9/2016 |

OTHER PUBLICATIONS

3rd Generation Partnership Project; Technical Specification Group Radio Access Network Evolved Universal Terrestrial Radio Access Network (E-UTRAN); S1 Application Protocol (S1AP) (Release 13), 3GPP TS 36.413 V13.4.0, Sep. 28, 2016, ( 333 pages total).
3rd Generation Partnership Project;Technical Specification Group Radio Access Network; Evolved Universal Terrestrial Radio Access Network, (E-UTRAN); S1 Application Protocol (S1AP), (Release 13), 3GPP TS 36.413, V13.3.0, Jun. 2016, 331 pages.
Extending DRX Cycle in Idle Mode, Huawei, HiSilicon, 3GPP TSG-RAN WG2 #91, R2-153339, Aug. 24-28, 2015, 3 pages.
Paging reception in eDRX not allowed, NEC, 3GPP TSG RAN WG3 meeting #94, R3-162889, Nov. 14-18, 2016, 25 pages.
LTE; Evolved Universal Terrestrial Radio Access (E-UTRA); User Equipment (UE) procedures in idle mode,(3GPP TS 36.304 version 13.2.0) Release 13; Aug. 2016.
United Kingdom Search Report for GB1616732.2 dated Mar. 9, 2017.
International Search Report for PCT/JP2017/032997 dated Feb. 13, 2018 [PCT/ISA/210].
Written Opinion for PCT/JP2017/032997 dated Feb. 13, 2018 [PCT/ISA/237].
Communication dated Mar. 3, 2020, from the Japanese Patent Office in Application No. 2019-516011.
Indian Office Action for IN Application No. 201917010675 dated Jan. 28, 2021.
"LTE; Evolved Universal Terrestrial Radio Access Network (E-UTRAN); S1 Application Protocol (S1 AP) (3GPP TS 36.413 version 13.3.0 Release 13)", ETSI Technical Specification, Aug. 25, 2016.

* cited by examiner

[Fig. 1]
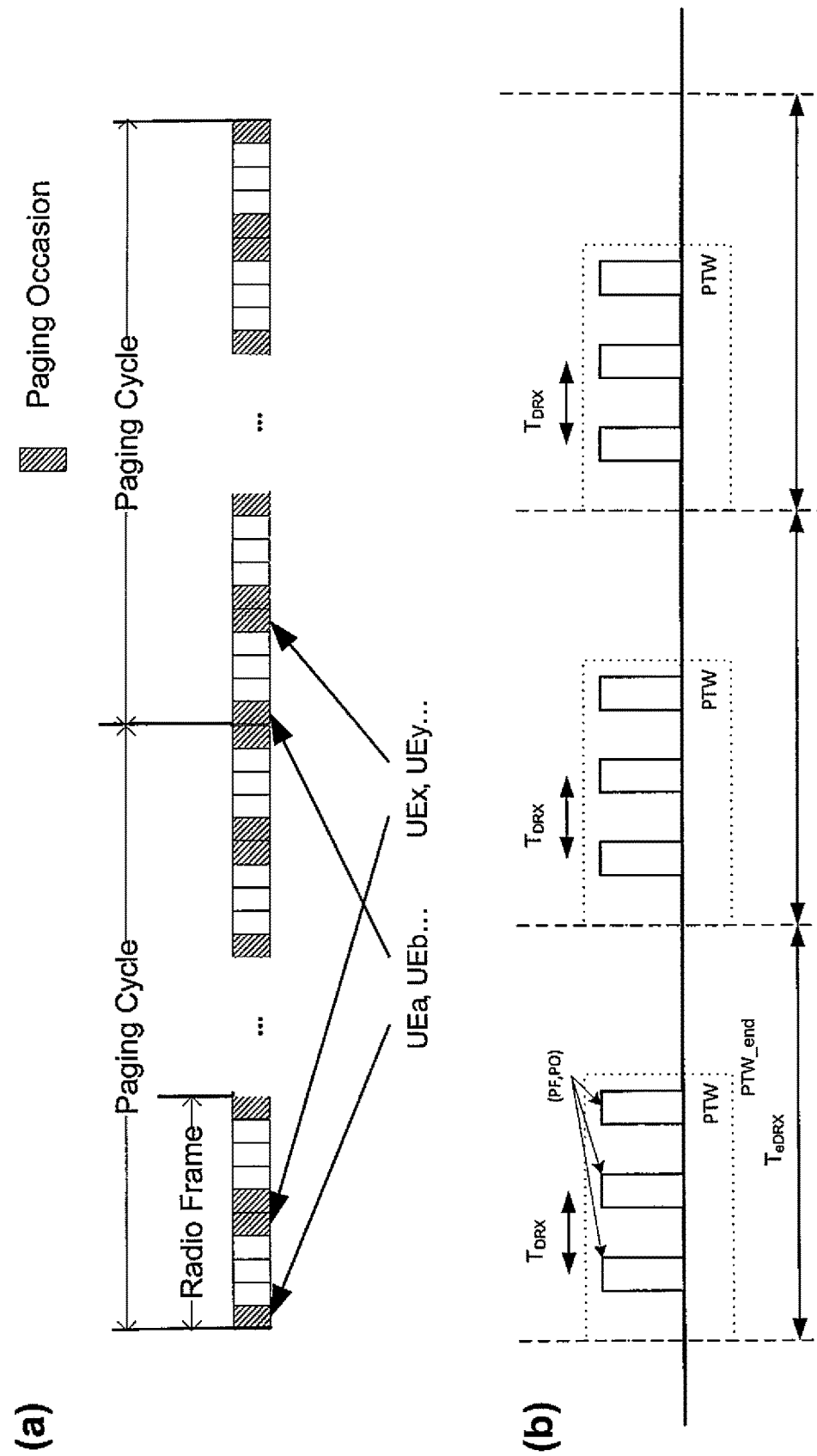

[Fig. 2]
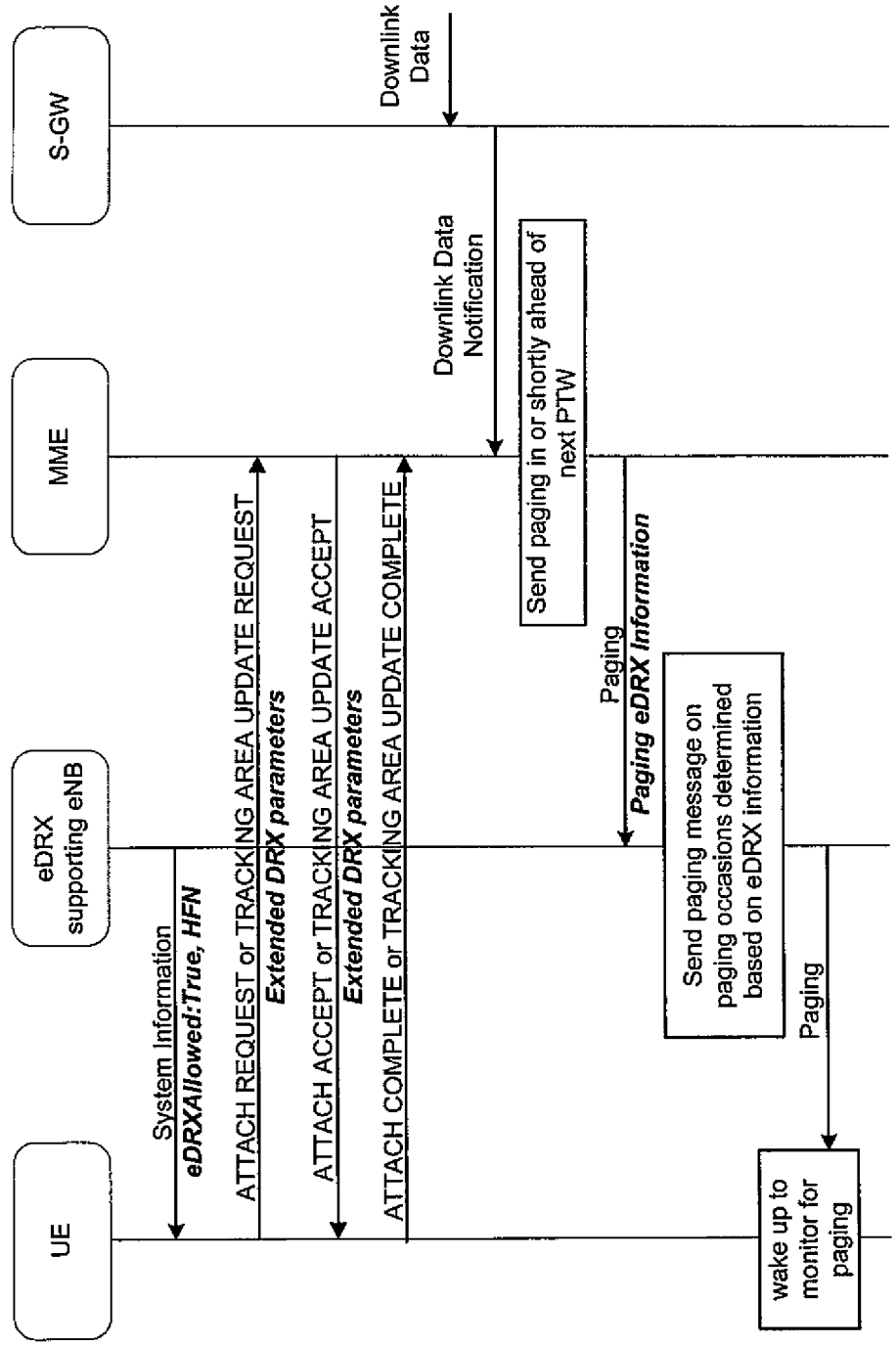

[Fig. 3]
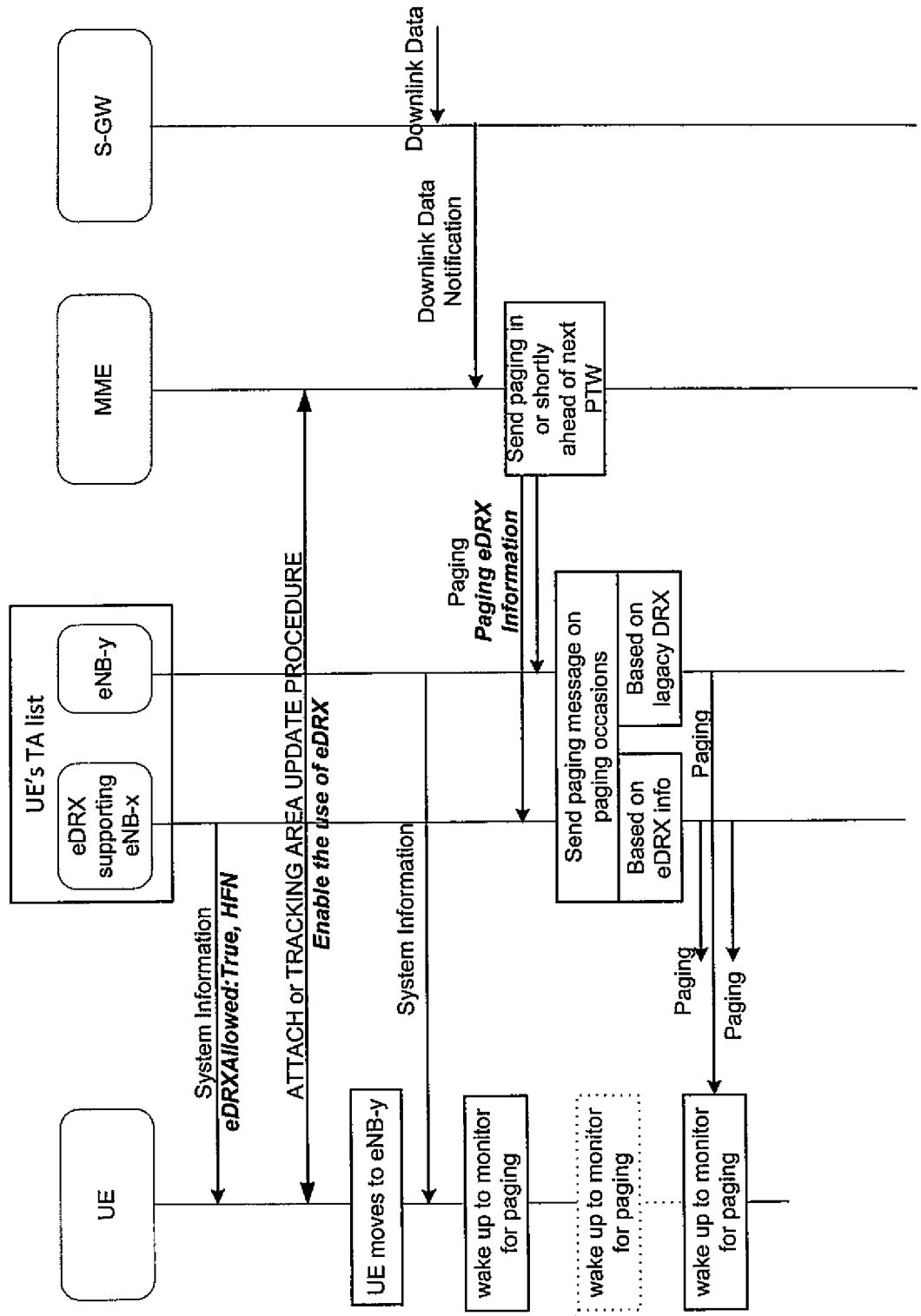

[Fig. 4]
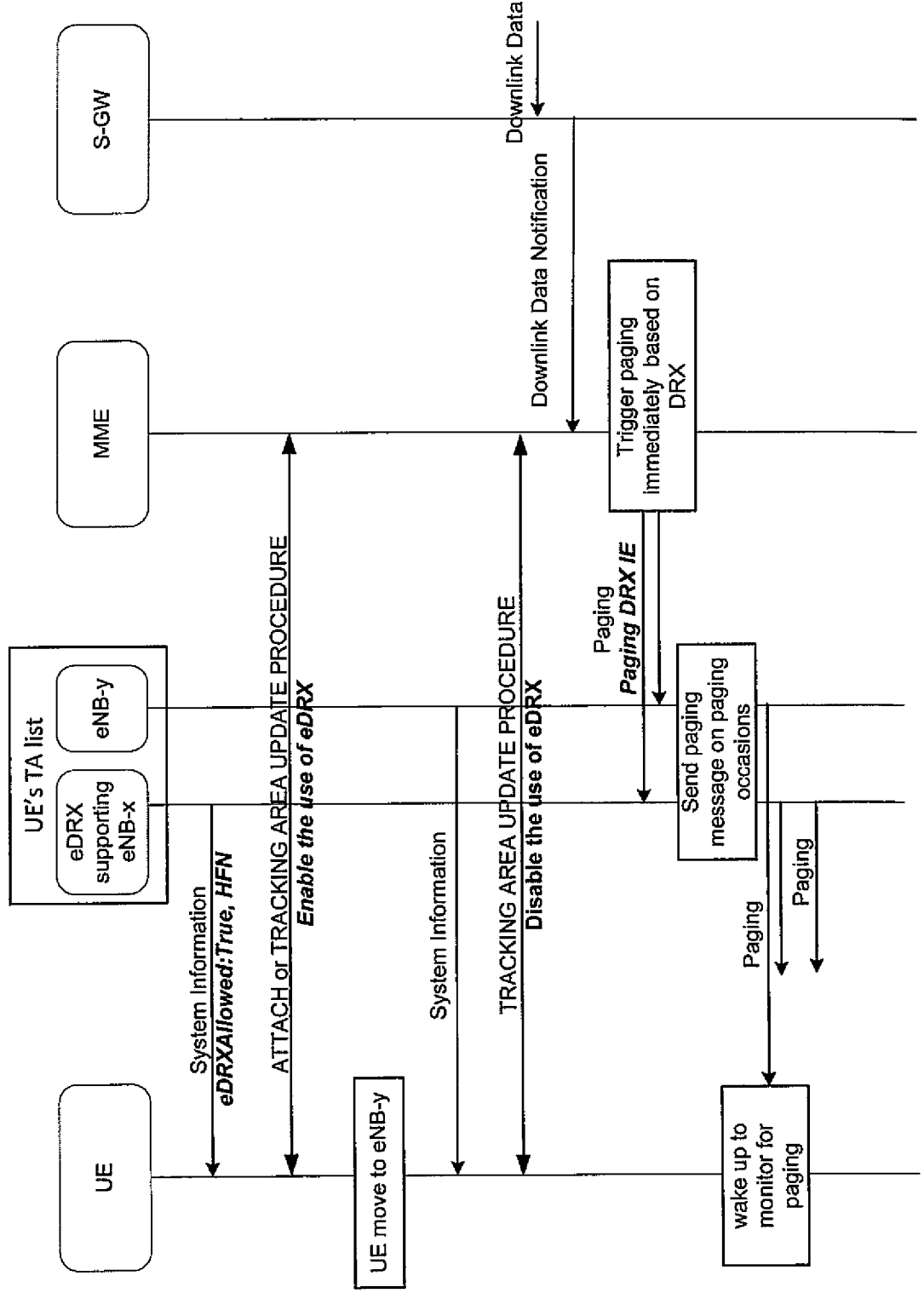

[Fig. 5]
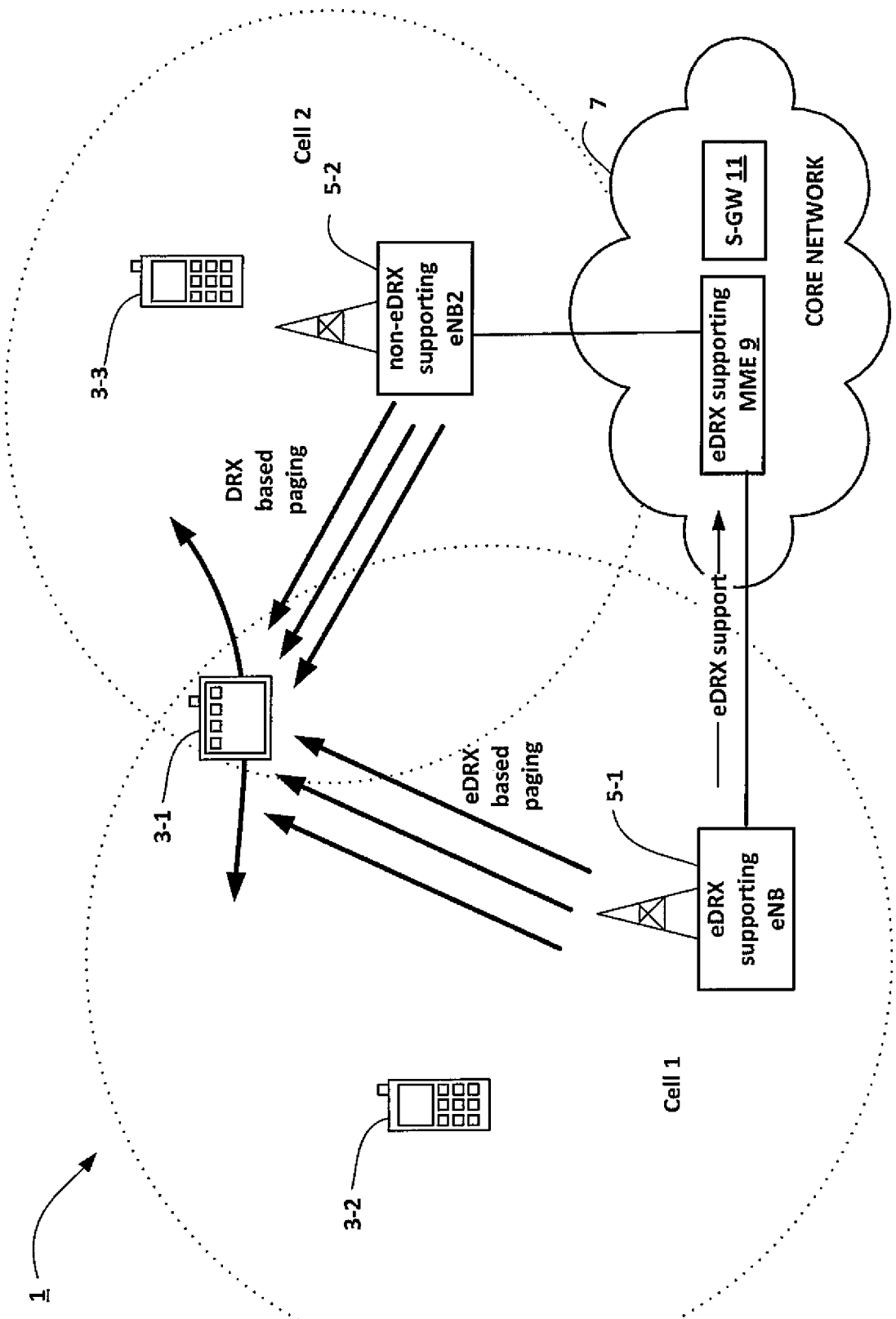

[Fig. 6]
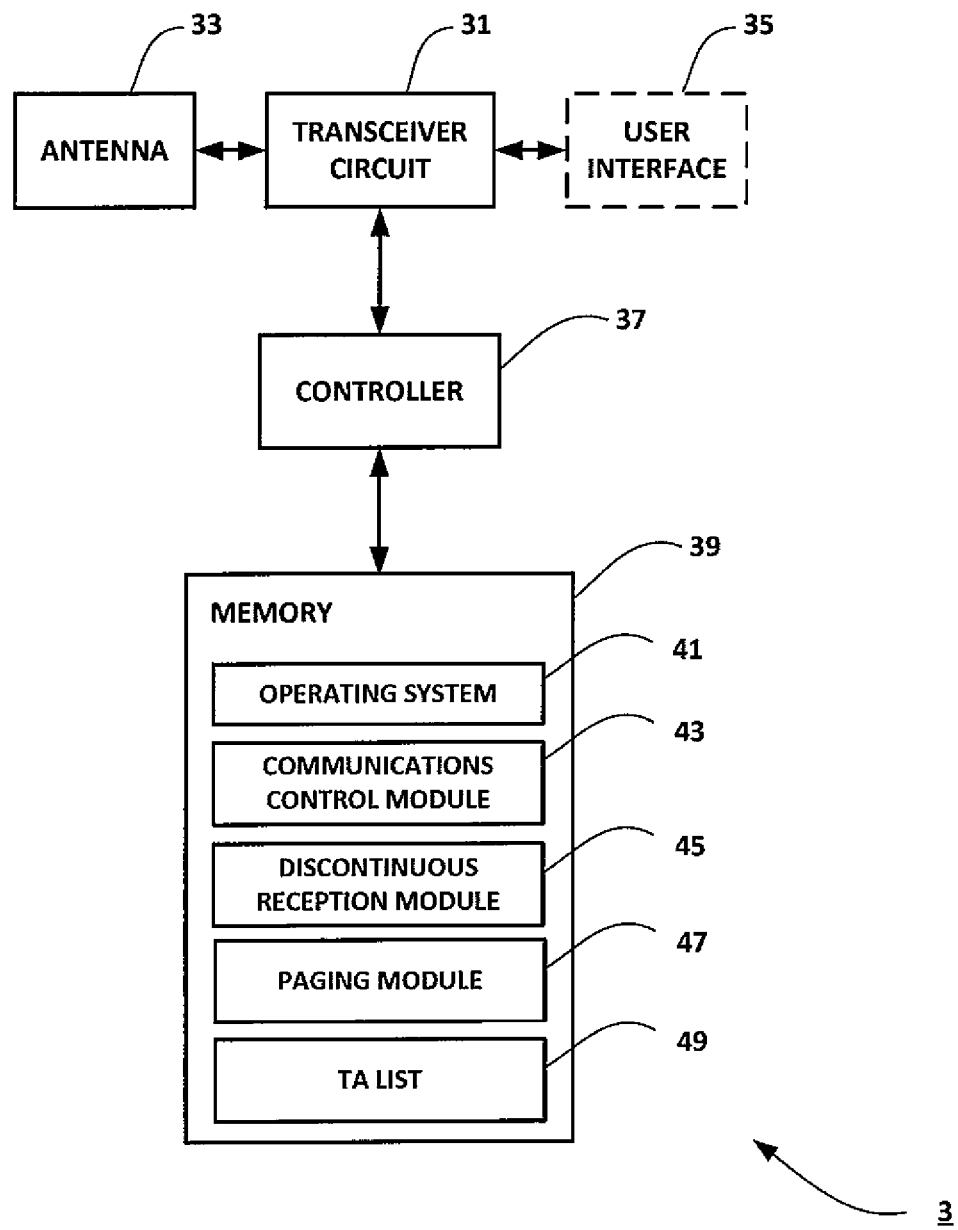

[Fig. 7]
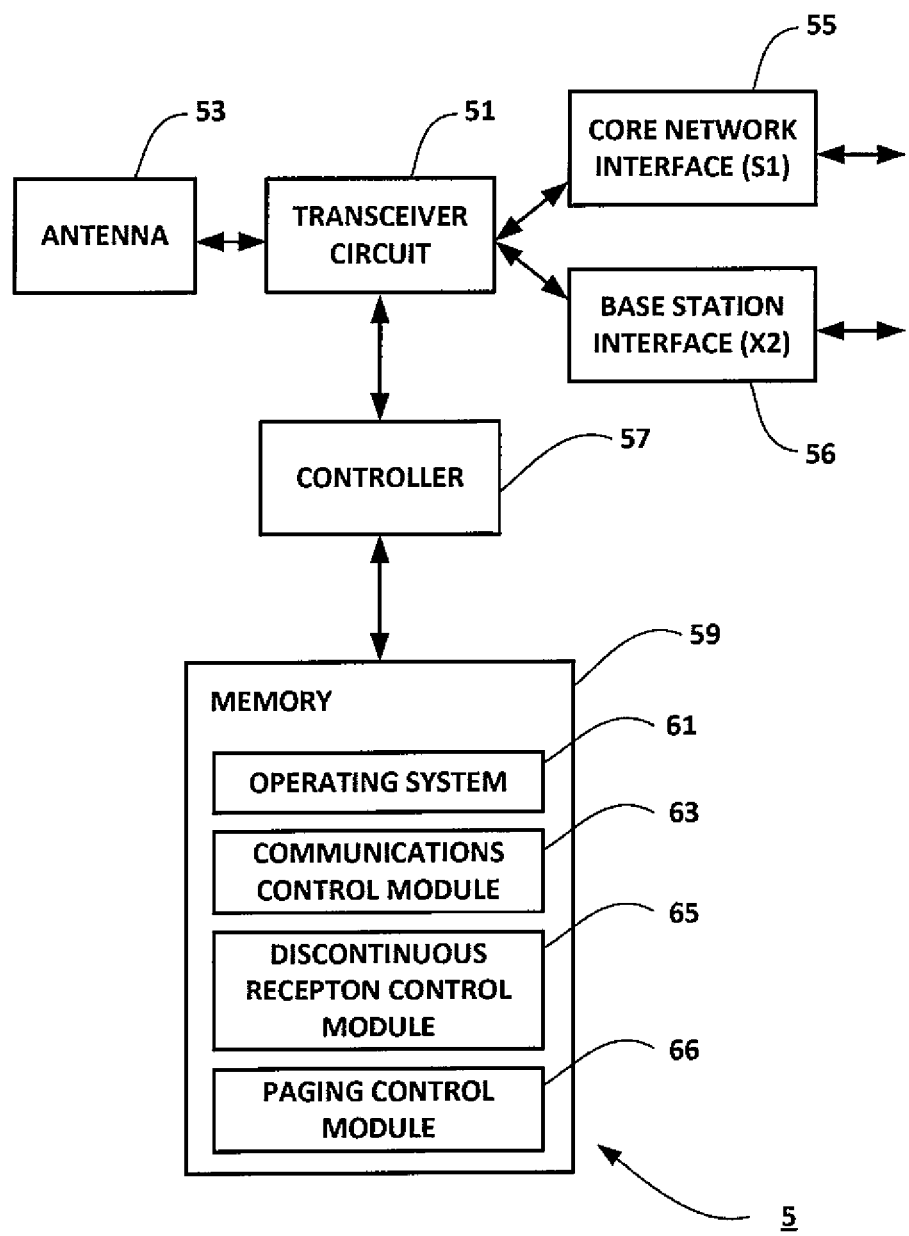

[Fig. 8]
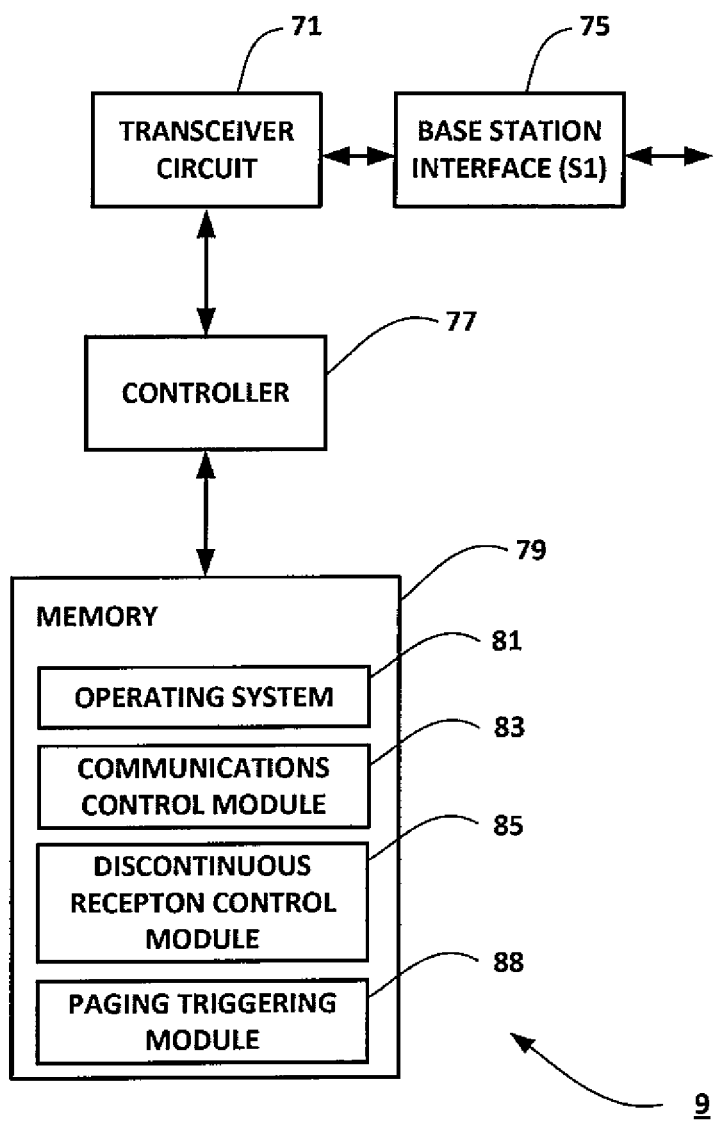

[Fig. 9]
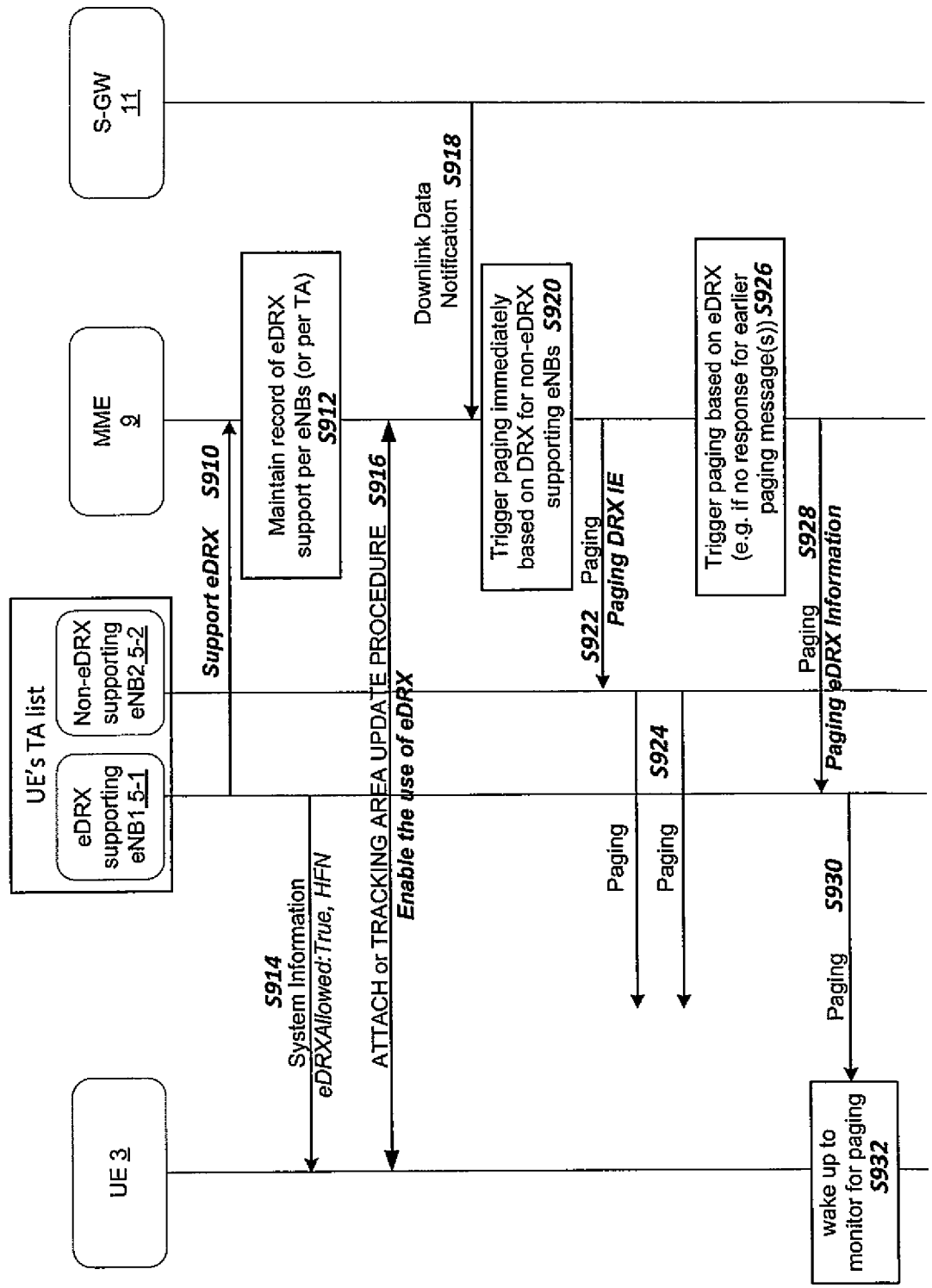

[Fig. 10]
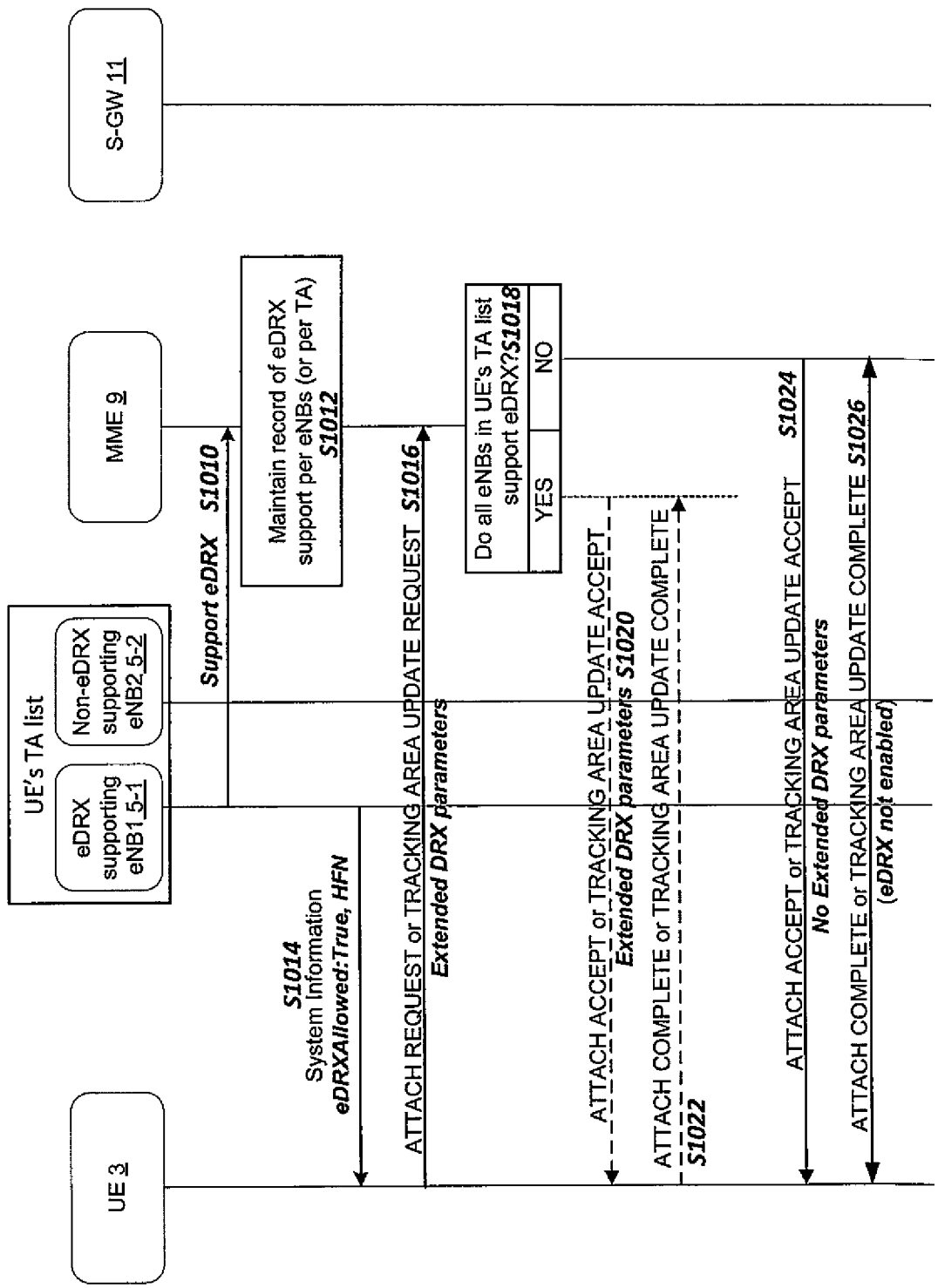

[Fig. 11]
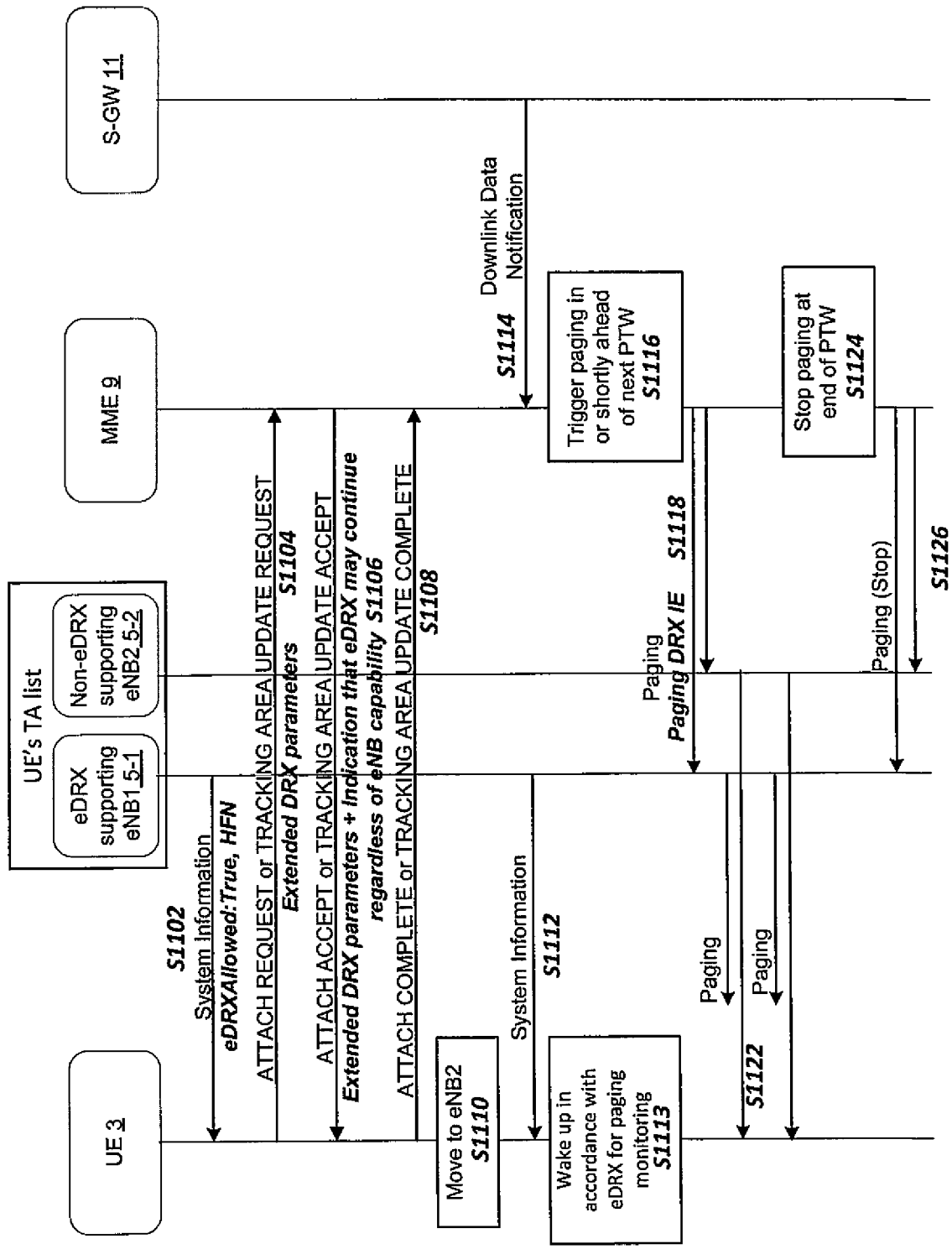

[Fig. 12]
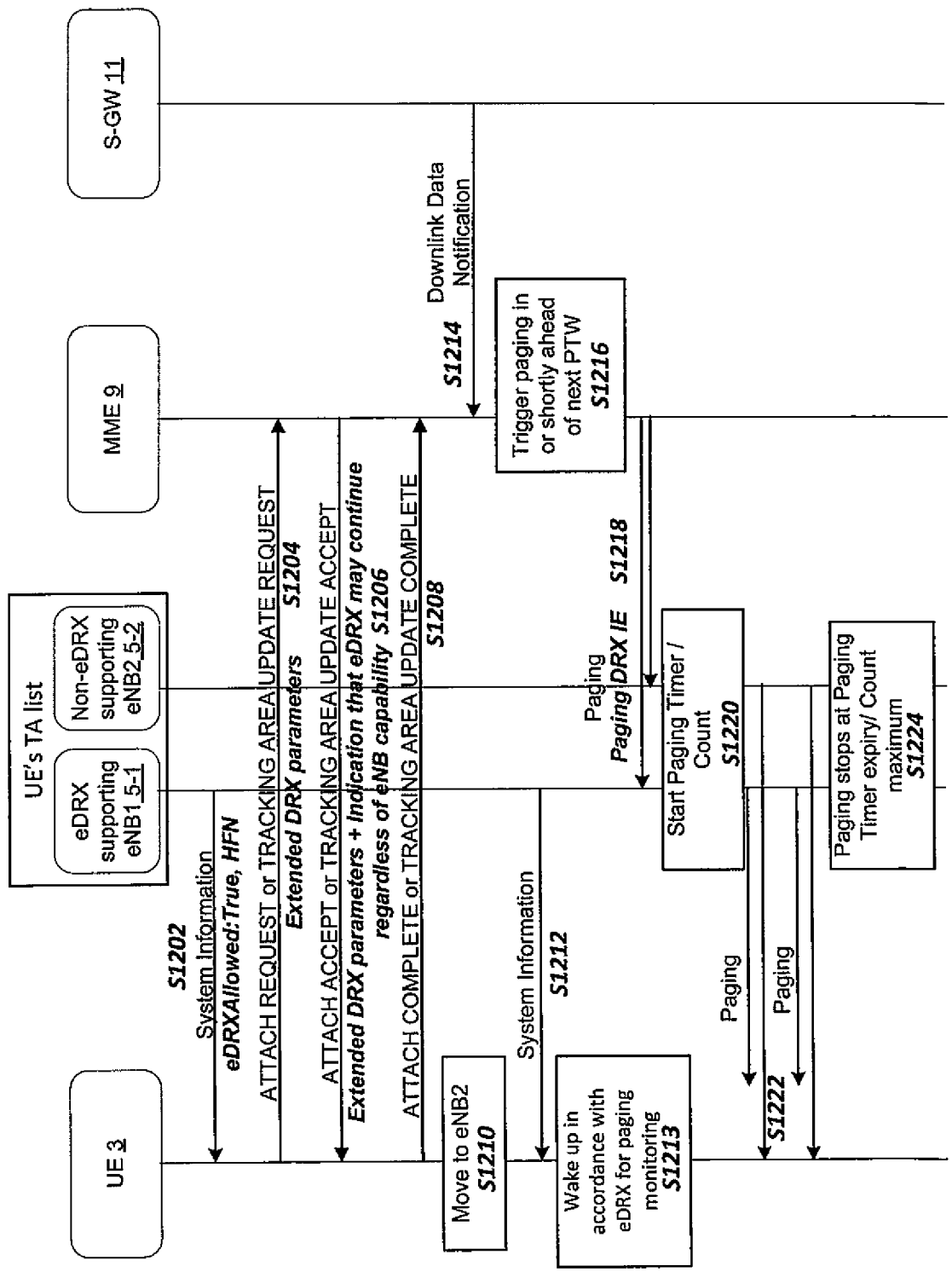

COMMUNICATION SYSTEM

CROSS REFERENCE TO RELATED APPLICATIONS

This application is a National Stage of International Application No. PCT/JP2017/032997 filed Sep. 13, 2017, claiming priority based on United Kingdom Patent Application No. 1616732.2 filed Sep. 30, 2016.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to the implementation and use of extended discontinuous reception (eDRX) capability in low power user equipment and related radio access network (RAN) and core network apparatus.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN). In a mobile (cellular) communications network operating in accordance with the 3GPP standards, a NodeB (or an eNB in LTE) is the base station via which communication devices connect to a core network and communicate to other communication devices or remote servers. For simplicity, the present application will use the term base station to refer to any such base stations including low power nodes (LPNs) that operate small (e.g. pico or femto) cells.

Communication devices that communicate via the base stations, often referred to generically as user equipment (or 'UEs'), may comprise, for example, mobile communication devices such as mobile telephones, smartphones, personal digital assistants, laptop/tablet computers, web browsers, e-book readers and/or the like. Such mobile (or even generally stationary) devices are typically operated by a user. However, 3GPP standards also make it possible to connect substantially autonomous UEs, referred to as 'Internet of Things' (IoT) devices, to the network. IoT devices such as these typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. IoT devices can be implemented as a part of a (generally) stationary apparatus such as vending machines, roadside sensors, POS terminals, although some IoT devices can be embedded in non-stationary apparatus (e.g. vehicles) or attached to animals or persons to be monitored/tracked. It will be appreciated that IoT devices are sometimes also referred to as Machine-Type Communication (MTC) communication devices or Machine-to-Machine (M2M) communication devices.

Narrow-band IoT (NB-IoT) devices form a special subset of MTC devices because of their strict narrow-band requirement and/or energy conservation needs (e.g. to ensure that batteries may not be replaced for several years). EUTRAN UEs that are not in the Narrow-band IoT subset of devices are often referred to, collectively, as wideband EUTRAN UEs (WB-EUTRAN UEs).

Effectively, the Internet of Things is a network of devices (or "things") equipped with appropriate electronics, software, sensors, network connectivity, and/or the like, which enables these devices to collect and exchange data with each other and with other communication devices. Whilst, for simplicity, the present application refers generally to IoT devices in the description it will be appreciated that the technology described can be implemented on any UEs (mobile and/or generally stationary) that can connect to a communications network for sending/receiving data, regardless of whether such communication devices are controlled by human input or software instructions stored in memory.

IoT devices are generally designed to be able to operate without human supervision for as long as possible. For example, IoT devices can be programmed to autonomously set up a connection to report an event and then to go back to a low-power mode of operation, such as a sleep mode, stand-by mode, and the like. Accordingly, ensuring battery longevity of devices is an important design consideration for NB-IoT devices work and is also a concern for WB-EUTRAN devices.

One mechanism for improving battery longevity is the use of so-called discontinuous reception (DRX). Conventionally, with normal DRX, a UE monitors for paging messages during a relatively short paging occasion (PO) which occurs only once with in a predefined paging (or 'DRX') cycle. In legacy LTE systems conforming to Release 12 of the 3GPP standards the maximum DRX cycle was 2.56 s meaning that a UE would wake up once every 2.56 s to check for paging messages. A UE configured with a DRX cycle can thus avoid monitoring for paging messages continuously, enabling the UE to switch off parts of the circuitry to reduce power consumption. Release 12 type DRX is illustrated in FIG. 1a which shows a number of UEs (UEa, UEb . . . etc) having paging occasions in the first sub-frame of the first radio frame of each paging cycle while other UEs (UEx, UEy . . . etc.) have paging occasions every in the fifth sub-frame of the first radio frame of each paging cycle. However, while DRX such as this can enhance battery life sufficiently for UEs (e.g. mobile telephones) that can be recharged regularly (e.g. once a day or even more frequently), it is not sufficient for prolonged battery life measured in years (rather than days or even hours).

In Release 13 of the 3GPP standards, a so-called extended DRX (eDRX) has been specified which enables a longer DRX cycle from 10.24 seconds up to 2621.44 seconds (~43.69 minutes) in idle mode for WB-EUTAN UEs and up to nearly 3 hours for NB-IoT UEs. This is illustrated in FIG. 1b which shows that a UE configured with an eDRX cycle of length $T_{eDRX}$ in idle mode monitors the control channel for paging during a paging transmission window (PTW) once every eDRX cycle. The PTW is periodic with starting time defined by a paging hyper-frame (PH). The PH is based on a formula that is known by a mobility managing entity (MME—the core network node responsible for keeping track of the locations of the UEs), UE, and eNB and is a function of the eDRX cycle and UE identity. During the PTW, the UE monitors paging according to the legacy DRX cycle ($T_{DRX}$) for the duration of the PTW or until a paging message is received for the UE, whichever is earlier.

Extended DRX can only be used in idle mode if all the relevant nodes (including the UE, the base station, and participating EPC node(s)) support it. To facilitate this, an indicator information element (eDRXAllowed IE) has been introduced to the system information. This is broadcast (e.g. in system information block 1 (SIB1)), by eDRX supporting eNBs, to UEs within range, to indicate if idle mode extended DRX is allowed in the cell. Thus, a UE will use eDRX only if eDRXAllowed is set to TRUE.

SUMMARY OF INVENTION

Technical Problem

However, the inventors have realised that problems can arise when a UE moves, in the idle mode, within a given tracking area (TA) from a base station that supports eDRX to a base station that does not support eDRX. This issue may occur, for example, where an operator has not yet upgraded all base stations of a given TA.

Similar problems can also arise when a UE moves among tracking areas (TAs), within the UE's TA list, from a first TA (TA_x) in which all base stations support eDRX, to a second TA (TA-y) in which all base stations do not support eDRX. This situation may arise, for example, in an area comprising a TA made up of small cells operated by small cell base stations (e.g. LPNs) and a separate TA made up larger ('macro') cells operated by macro base stations. A UE will typically move between small cells and macro cell, and will hence be configured with both the macro TA and the small cell TA in its TA list. Thus, problems can occur if the macro base stations have been upgraded to support eDRX but the small cell base stations have not been upgraded. Similarly, where a given UE moves between a home environment and an office environment where only the base station(s) in one of those environments has been upgraded to support eDRX the UE will move regularly between a TA in which all base stations support eDRX and a second TA in which all base stations do not support eDRX.

The present invention seeks to provide a communication apparatus and methods for meeting or at least partially addressing the above issues.

When considering how to address issues associated with idle mode mobility between cells the inventors considered, in particular, the impact of what might happen when the procedure of FIG. 2 is used for eDRX.

In the procedure of FIG. 2, a UE that supports Idle mode eDRX may, when the UE is in a cell that supports eDRX and has received an eDRX allowed information element (IE) in SIB1 from the corresponding eDRX supporting base station, request to use eDRX and negotiate associated eDRX parameters. The UE requests use of eDRX by including one or more desired eDRX parameter(s) in an appropriate request message, sent to the MME, to initiate an Attach procedure or Tracking Area Update (TAU) procedure (e.g. in an Attach Request message or TAU Request message). An MME that supports idle mode eDRX (and agrees the desired parameters) may accept the request by including the one or more (agreed) eDRX parameter(s) in an associated response (e.g. in an Attach Accept message or TAU Accept message). The Attach/TAU procedure can then proceed to completion at which point the UE sends a corresponding completion message to the MME (e.g. an Attach Complete message or TAU Complete message).

The network and the UE will store the agreed eDRX related parameter(s) and use them appropriately to determine when the MME sends a paging message to trigger paging and when the UE should monitor for paging messages. Thus, when the MME receives a subsequent notification indicating that downlink data is available for the UE (e.g. a Downlink data notification received from a serving gateway (S-GW)) this acts as a paging trigger which triggers the MME to send a paging message, including appropriate paging eDRX information (e.g. the eDRX cycle time, $T_{eDRX}$, and possibly the paging time window period) to base stations belonging to the UE's TA list, including the corresponding eDRX supporting base station. This triggers the eDRX supporting base station to broadcast paging messages, for the UE in question, in the cell(s) that it operates. The paging message sent by the MME to trigger this paging may be sent within a PTW (e.g. if the paging trigger from the S-GW was received within a PTW). Otherwise, the MME will send the paging message shortly ahead of the beginning of the next PTW.

Thus, when the UE wakes up in accordance with the eDRX cycle to monitor paging it will receive the paging message sent by the eDRX supporting base station.

FIG. 3 illustrates issues that the inventors have realised may occur, using the procedure of FIG. 2, in a scenario in which the UE moves from a base station that supports eDRX (eNB-x) to a base station (e.g. of the same tracking area or belonging to a TA in the UE's TA list) that does not support eDRX (eNB-y).

In this example, a UE that supports Idle mode eDRX may, when the UE is in a cell that supports eDRX and has received an eDRX allowed information element in SIB1 from the corresponding eDRX supporting base station, engage in an Attach/TAU procedure with the MME to enable use of eDRX and negotiate associated eDRX parameters as described with reference to FIG. 2.

In this example, however, the UE then moves into the cell of the base station (eNB-y) that does not support eDRX (and does not perform a TAU procedure with the MME when it does).

When the UE receives system information (e.g. SIB1) from the base station (eNB-y) that does not support eDRX, the eDRX-Allowed-r13 information element will not be present. Accordingly, the UE will determine that it should not use eDRX and will, consequently, wake up more frequently to monitor paging as illustrated. However, as far as the MME is concerned, the UE is still using the eDRX configuration negotiated and agreed upon during the Attach/TAU procedure undertaken when the UE was in the cell of the base station that supports eDRX (eNB-x). Accordingly, the MME will not even attempt to trigger paging of the UE, for the base stations in the UE's TA list, until just before or during the next PTW. When the MME does trigger paging (in or shortly before the next PTW), the non-eDRX supporting base station (eNB-y) will not recognise the paging eDRX information element and will thus send paging messages using the legacy DRX procedures.

In view of the potentially long eDRX cycles this could be a relatively long time during which the UE wakes up to monitor for paging on many occasions which is very inefficient.

This can, therefore, result in significant delays in reaching the UE which is undesirable.

The inventors considered the possibility of using a TAU request, whenever a UE moves from an eDRX supporting base station to a non-eDRX base station to disable eDRX, as illustrated in FIG. 4 (or to enable eDRX whenever a UE moves from a non-eDRX supporting base station to an eDRX base station).

In this example, a UE that supports Idle mode eDRX may, when the UE is in a cell that supports eDRX and has received an eDRX allowed information element in SIB1 from the corresponding eDRX supporting base station, engage in an Attach/TAU procedure with the MME to enable use of eDRX and negotiate associated eDRX parameters as described with reference to FIG. 2.

In this example, however, when the UE receives system information (e.g. SIB1), that does not include the eDRX-Allowed-r13 information element, from the base station (eNB-y) that does not support eDRX, the UE determines that it should not use eDRX and performs a TAU procedure with the MME to disable eDRX. Accordingly, the MME is aware that the UE is no longer using the eDRX configuration negotiated and agreed upon during the Attach/TAU procedure undertaken when the UE was in the cell of eNB-x. Thus, when the MME needs to trigger paging of the UE in the tracking area it can do so using normal DRX by sending, to each of the base stations of the UE's TA list, a paging message including the legacy paging DRX information element.

However, whilst this has the benefit that it does allow the UE to receive paging more quickly than in the example of FIG. 3, it will result in more TAU procedures being carried out which is undesirable from the point of power consumption (especially for low power UEs such as IoT devices).

Solution to Problem

In one aspect of the invention there is provided a core network communication node for a cellular communication system, the core network communication node comprising: a controller and a transceiver; wherein the controller is configured: to maintain information identifying at least one tracking area comprising a plurality of communication apparatus that each respectively operates at least one cell of the cellular communication system; to control the transceiver to receive at least one indication that at least one communication apparatus of the at least one tracking area of the cellular communication system supports extended discontinuous reception, eDRX; to determine that paging is required for a communication device and that the communication device may be located in a cell of a communication apparatus of the at least one tracking area; to trigger paging of the communication device in accordance with discontinuous reception, DRX, information that is not specific to eDRX via communication apparatus of the at least one tracking area for which an indication of support for eDRX has not been received; and to trigger paging of the communication device in accordance with eDRX specific information via each communication apparatus of the at least one tracking area for which an indication of support for eDRX has been received.

In one aspect of the invention there is provided a core network communication node for a cellular communication system, the core network communication node comprising: a controller and a transceiver; wherein the controller is configured: to maintain information identifying at least one tracking area comprising a plurality of communication apparatus that each respectively operates at least one cell of the cellular communication system; to control the transceiver to receive at least one indication that at least one communication apparatus of the at least one tracking area of the cellular communication system supports extended discontinuous reception, eDRX; to receive, from a communication device located in a cell of a communication apparatus of the at least one tracking area, a request message comprising information for enabling eDRX; to determine if all the plurality of communication apparatus of the at least one tracking area have been indicated to support eDRX; to control the transceiver to transmit a message to the communication device rejecting eDRX enablement when the controller determines that not all the plurality of communication apparatus of the at least one tracking area have been indicated to support eDRX; and to control the transceiver to transmit an message to the communication device accepting eDRX enablement when the controller determines that all the plurality of communication apparatus of the at least one tracking area have been indicated to support eDRX.

In one aspect of the invention there is provided communication apparatus for operating at least one cell of a cellular communication system, the communication apparatus comprising: a controller and a transceiver; wherein the controller is configured: to provide support for use of extended discontinuous reception, eDRX, by a communication device in the cell; and to control the transceiver to provide an indication that the communication apparatus supports eDRX, to a core network communication node.

In one aspect of the invention there is provided a core network communication node for a cellular communication system, the core network communication node comprising: a controller and a transceiver; wherein the controller is configured: to maintain information identifying at least one tracking area comprising a plurality of communication apparatus that each respectively operates at least one cell of the cellular communication system; to control the transceiver to send, to a communication device located in a cell of a communication apparatus of the at least one tracking area, an indication that extended discontinuous reception, eDRX, may be used regardless of whether the communication apparatus that operates the cell in which the communication device is located supports eDRX; to control the transceiver to communicate, with the communication device, to enable use of eDRX at the communication device in accordance with an eDRX configuration; to determine that paging is required for the communication device; and to trigger paging of the communication device, via the plurality of communication apparatus of the at least one tracking area in, or just prior to, a paging transmission window, PTW, in accordance with the eDRX configuration.

In one aspect of the invention there is provided a communication device for a cellular communication system, the communication device comprising: a controller and a transceiver; wherein the controller is configured: to control the transceiver to receive, from a core network communication node, an indication that extended discontinuous reception, eDRX, may be used regardless of whether a communication apparatus that operates a cell in which the communication device is located supports eDRX; to control the transceiver to communicate, with the core network communication node, to enable use of eDRX at the communication device in accordance with an eDRX configuration regardless of whether the communication apparatus that operates the cell in which the communication device is located supports eDRX; and to control the transceiver to wake up to monitor for paging messages during a paging transmission window, PTW, in accordance with the eDRX configuration.

In one aspect of the invention there is provided communication apparatus for operating at least one cell of a cellular communication system, the communication apparatus comprising: a controller and a transceiver; wherein the controller is configured: to control the transceiver to receive, from a core network communication node, a message to trigger paging of a communication device in, or just prior to, a paging transmission window, PTW, in accordance with an eDRX configuration; to control the transceiver to send paging messages in the cell in accordance with discontinuous reception, DRX, information that is not specific to eDRX; and to stop the transceiver from sending the paging messages in the cell at the end of the PTW.

In one aspect of the invention there is provided a method performed by a core network communication node in a cellular communication system, the method comprising: maintaining information identifying at least one tracking area comprising a plurality of communication apparatus that each respectively operates at least one cell of the cellular communication system; receiving at least one indication that at least one communication apparatus of the at least one tracking area of the cellular communication system supports extended discontinuous reception, eDRX; determining that paging is required for a communication device and that the communication device may be located in a cell of a communication apparatus of the at least one tracking area; triggering paging of the communication device in accordance with discontinuous reception, DRX, information that is not specific to eDRX via communication apparatus of the at least one tracking area for which an indication of support for eDRX has not been received; and triggering paging of the communication device in accordance with eDRX specific information via each communication apparatus of the at least one tracking area for which an indication of support for eDRX has been received.

In one aspect of the invention there is provided a method performed by a core network communication node in a cellular communication system, the method comprising: maintaining information identifying at least one tracking area comprising a plurality of communication apparatus that each respectively operates at least one cell of the cellular communication system; receiving at least one indication that at least one communication apparatus of the at least one tracking area of the cellular communication system supports extended discontinuous reception, eDRX; receiving, from a communication device located in a cell of a communication apparatus of the at least one tracking area, a request message comprising information for enabling eDRX; determining if all the plurality of communication apparatus of the at least one tracking area have been indicated to support eDRX; transmitting a message rejecting eDRX enablement to the communication device when the controller determines that not all the plurality of communication apparatus of the at least one tracking area have been indicated to support eDRX; and transmitting an message accepting eDRX enablement to the communication device when the controller determines that all the plurality of communication apparatus of the at least one tracking area have been indicated to support eDRX.

In one aspect of the invention there is provided a method performed by communication apparatus that operates at least one cell of a cellular communication system, the method comprising: providing support for the use of extended discontinuous reception, eDRX, by a communication device in the cell; and providing an indication that the communication apparatus supports eDRX, to a core network communication node.

In one aspect of the invention there is provided a method performed by a core network communication node in a cellular communication system, the method comprising: maintaining information identifying at least one tracking area comprising a plurality of communication apparatus that each respectively operates at least one cell of the cellular communication system; sending, to a communication device located in a cell of a communication apparatus of the at least one tracking area, an indication that extended discontinuous reception, eDRX, may be used regardless of whether the communication apparatus that operates the cell in which the communication device is located supports eDRX; communicating, with the communication device, to enable use of eDRX at the communication device in accordance with an eDRX configuration; determining that paging is required for the communication device; and triggering paging of the communication device, via the plurality of communication apparatus of the at least one tracking area in, or just prior to, a paging transmission window, PTW, in accordance with the eDRX configuration.

In one aspect of the invention there is provided a method performed by a communication device in a cellular communication system, the method comprising: receiving, from a core network communication node, an indication that extended discontinuous reception, eDRX, may be used regardless of whether a communication apparatus that operates a cell in which the communication device is located supports eDRX; communicating, with the core network communication node, to enable use of eDRX at the communication device in accordance with an eDRX configuration regardless of whether the communication apparatus that operates the cell in which the communication device is located supports eDRX; and waking up to monitor for paging messages during a paging transmission window, PTW, in accordance with the eDRX configuration.

In one aspect of the invention there is provided a method performed by communication apparatus that operates at least one cell of a cellular communication system, the method comprising: receiving, from a core network communication node, a message to trigger paging of a communication device in, or just prior to, a paging transmission window, PTW, in accordance with an eDRX configuration; sending paging messages in the cell in accordance with discontinuous reception, DRX, information that is not specific to eDRX; and stopping the transceiver from sending the paging messages in the cell at the end of the PTW.

In one aspect of the invention there is provided a communication system comprising at least one core network node according to any above aspect, at least one communication apparatus that operates a cell, and at least one communication device.

In one aspect of the invention there is provided a communication system comprising at least one core network node, at least one communication apparatus according to any above aspect, and at least one communication device.

In one aspect of the invention there is provided a communication system comprising at least one core network node, at least one communication apparatus that operates a cell, and at least one communication device according to any above aspect.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

It will be appreciated that the term 'legacy', as used herein with reference to methods and or apparatus, refers to methods and/or apparatus known to those familiar with the relevant standards at the priority date of this application and in particular, but not exclusively, to methods and/or apparatus as standardised at the priority date (for example, but not limited to, as standardised in Release 13 or earlier of the relevant 3GPP standards).

Whilst specific hardware apparatus having a specific physical structure (e.g. controllers and transceiver circuitry) have been disclosed for performing the various procedures described herein, each step of the methods disclosed in the description and/or forming part of the claims, may be implemented by any suitable means for performing that step. In accordance with this each method aspect of the invention has a corresponding apparatus aspect comprising respective means for performing each step of that method aspect.

Example embodiments of the invention will now be described by way of example only with reference to the attached figures in which:

BRIEF DESCRIPTION OF DRAWINGS

FIG. 1 illustrates (a) DRX and (b) extended DRX paging systems.

FIG. 2 is a simplified message sequence diagram illustrating paging in accordance with an extended DRX mechanism.

FIG. 3 is a simplified message sequence diagram illustrating, paging in accordance with an extended DRX mechanism, in a scenario involving both eDRX supporting and non-eDRX supporting base stations.

FIG. 4 is a simplified message sequence diagram illustrating, paging in accordance with an extended DRX mechanism, in another scenario involving both eDRX supporting and non-eDRX supporting base stations.

FIG. 5 illustrates schematically a cellular telecommunication system to which example embodiments of the invention may be applied.

FIG. 6 is a simplified block diagram of a UE that may form part of the system shown in FIG. 5.

FIG. 7 is a simplified block diagram of a base station that may form part of the system shown in FIG. 5.

FIG. 8 is a simplified block diagram of a mobility management entity that may form part of the system shown in FIG. 5.

FIG. 9 is a simplified message sequence diagram illustrating an exemplary method that may be implemented in the system shown in FIG. 5.

FIG. 10 is a simplified message sequence diagram illustrating another exemplary method that may be implemented in the system shown in FIG. 5.

FIG. 11 is a simplified message sequence diagram illustrating still another exemplary method that may be implemented in the system shown in FIG. 5.

FIG. 12 is a simplified message sequence diagram illustrating yet another exemplary method that may be implemented in the system shown in FIG. 5.

DESCRIPTION OF EMBODIMENTS

Overview

FIG. 5 schematically illustrates a telecommunications network 1 in which IoT devices 3-1 (e.g. a NB-IoT device) and other UEs 3-2, 3-3 (e.g. mobile telephones) can communicate with each other and/or other communication devices via E-UTRAN base stations 5-1 and 5-2 and a core network 7 using an E-UTRA radio access technology (RAT). As those skilled in the art will appreciate, whilst one IoT device 3-1, two other UEs 3-2, 3-3, and two base stations 5-1, 5-2 are shown in FIG. 5 for illustration purposes, the system, when implemented, will typically include other base stations and communication devices. In the telecommunications network 1 of FIG. 5 eDRX may be employed as generally described above with reference, in particular to FIGS. 1b and 2.

Each base station 5 operates one or more associated cell. In this example, the first base station 5-1 operates 'Cell 1' and the second base station 5-2 operates 'Cell 2'. Communication devices may be located in a cell in an radio resource control (RRC) idle mode (not sending/receiving data) or may connect to either cell (depending on their location and possible on other factors, e.g. signal conditions, subscription data, capability, and/or the like) by establishing a radio resource control (RRC) connection with the appropriate base station 5 operating that cell.

In FIG. 5, the IoT device 3-1 is in idle mode and is able to move between (and camp on) cell 1 and cell 2 operated by the base stations 5-1 and 5-2. Thus, when operating in RRC idle mode (not sending/receiving data), the IoT device 3-1 camps on the cell having the best signal quality, and when in RRC active mode, the IoT device 3-1 communicates data via that cell.

The base stations 5-1, 5-2 are connected to the core network 7 via an S1 interface and to each other via an X2 interface (not shown). In this example, the base stations 5 belong to the same tracking area (TA) or at least to tracking areas that are listed in the UE's TA list. One of the base stations shown in FIG. 5 is an eDRX supporting base station (eNB-x) 5-1 that is capable of using extended DRX based paging in the cell (cell 1) that it operates. The other base station 5-2 shown does not, however, support eDRX and so is only capable of supporting legacy (unextended) DRX cycles.

A mobility management entity (MME) 9 is located in the core network 7 and is the network node responsible for keeping track of the locations of UEs (e.g. the mobile telephones and the IoT device 3-1) in the idle mode within the communications network. In particular, the MME 9 stores an identifier of the mobile communication devices' last known cell (or tracking area) so that they can be notified ('paged') when there is an incoming (voice or data) call using a paging message broadcast in the last known cell(s) (or cells of the last known tracking area). Thus, when a paged UE responds to the paging message an appropriate random access channel (RACH) procedure can be completed to set up a communication path via the base station 5 currently serving the particular mobile communication device. The MME 9 shown is configured to support both extended discontinuous reception (e.g. eDRX as defined in Release 13 of the relevant 3GPP standards) and conventional discontinuous reception (e.g. DRX as defined in Release 13 or earlier of the relevant 3GPP standards).

A serving gateway (S-GW) 11 is also located in the core network 7. The S-GW 11 is the main packet routing and forwarding node in core network 7. The S-GW 11 connects to the MME 9 via an S11 interface and to the base stations 5 via an S1-U interface.

Beneficially, in this example, the eDRX supporting base station 5-1 is configured to notify the MME 9 that it supports eDRX (e.g. using an appropriately formatted SI-AP message from base station to MME). Accordingly, the MME 9 is able to determine that the eDRX supporting base station 5-1 supports eDRX and to maintain a record of that support. Moreover, since the MME 9 is able to determine that the eDRX supporting base station 5-1 supports eDRX is also able to determine that the MME 9 is able to determine, implicitly, that the non-eDRX supporting base station 5-2 does not support eDRX (assuming all eDRX supporting base stations belonging to a given UE's TA, or to TA's belonging to a given UE's TA list, notify the MME 9 of such support). Even if some eDRX supporting base stations may not have provided a notification of their eDRX support to the MME 9, the MME 9 is able to identify, implicitly, base stations for which eDRX support is not known (and cannot, therefore, be guaranteed).

In this example, different paging timings can be used depending on eDRX support. Specifically, as described in more detail below, the MME 9 is configured, when it is required to page the UE 3, to consider both the UE and base station's eDRX capability. The MME 9 is configured to identify a first base station group comprising each eDRX supporting base station in the UE's TA or TA list, and a second base station group comprising each base station in the UE's TA or TA list that does not support eDRX (or for which eDRX cannot be guaranteed). Beneficially, therefore, the MME 9 can then treat the base station(s) of each group differentially by triggering paging of each base station in the first group in accordance with any agreed eDRX parameters (e.g. in or shortly before an associated PTW) and by triggering paging of each base station in the second group in accordance with conventional (legacy) DRX parameters and procedures (e.g. as soon as the MME 9 receives a notification from the S-GW 11 that downlink data is waiting for transmission to the UE).

In another example, described in more detail below, the MME 9 is configured, when it receives an Attach or TAU request from a UE that includes eDRX parameters indicating that the UE wishes to use eDRX parameters, to accept the request to enable eDRX in the Attach/TAU request, only if all base stations in that UE's TA (or TA list) support eDRX. Otherwise, the MME 9 is configured to reject the request to enable eDRX in the Attach/TAU request. Like the previous example, in this example, each eDRX supporting base station is configured to notify the MME 9 that it supports eDRX and the MME 9 is thus able to identify eDRX supporting and non-eDRX supporting base stations.

This example has the benefit that the same paging time may be used among all base stations albeit at the expense of additional MME features for eDRX acceptance/rejection.

In yet another beneficial example, described in more detail below, the MME 9 may not need to receive a notification of eDRX support (or non-support) from the base station(s). Instead, the MME 9 controls the paging transmission window and the use of eDRX is, in effect, invisible at the base station(s). In this example, if a request to enable eDRX is accepted by the MME 9, the UE 3 is configured to enable eDRX regardless of whether the system information (e.g. SIB1) includes an indication of eDRX support (e.g. regardless of the presence or absence of eDRX-Allowed-r13 in the system information).

In this example, the MME 9 is configured to send a message (e.g. a non-access stratum (NAS) message), to inform the UE 3 that eDRX is enabled regardless of whether a base station supports it or not. Conveniently, this message could be in the form of an attach/TAU accept message that includes eDRX parameters and a separate indication that the UE 3 may continue to use eDRX regardless of base station support for eDRX. Conveniently, this may also occur implicitly when the MME 9 is already aware of the UEs capability to use eDRX (e.g following a previous successful request from the UE 3 to request eDRX enablement) this message could be in the form of an attach/TAU accept message that includes eDRX parameters but that is sent in response to a request for attach/TAU from UE 3 that does not request eDRX enablement (by including eDRX parameters).

Thus, when the UE 3 receives the attach/TAU accept message that includes eDRX parameters it knows that eDRX is enabled regardless of whether a base station supports it or not.

When paging is required, the MME 9 sends a paging trigger in, or shortly ahead of, the PTW to trigger conventional (legacy) DRX paging at the base station. As far as the base station is concerned, therefore, the paging trigger simply triggers conventional (legacy) DRX paging and sends paging messages in accordance with this. A UE 3 that has successfully requested eDRX enablement will, therefore, always wake up to monitor for paging messages in accordance with the agreed eDRX parameters regardless of whether the UE 3 moves to a base station (belonging to the UE's TA list) that does not support eDRX (e.g. a base station that does not broadcast system information including an indication of eDRX support).

To facilitate implementation of this example the MME 9 is at least loosely synchronised with the base station(s) and hence UEs 3 of the network 1 (e.g. the hyperframe number (HFN)/system frame number (SFN) are at least loosely synchronised). This loose synchronisation between base stations and MME is already a feature of eDRX enabled systems. Thus the MME 9 is enabled to calculate the PTW [HFN, SFN] roughly. In order to allow more precise synchronisation, to account of the fact that there is no control of the PTW at the base station in this example, an HFN counter (maybe also SFN counter) could be implemented in the MME 9. The value of the counter(s) can then be updated at roughly the same time as the HFN counter value in the base stations.

Since the HFN is only present in the system information broadcast for eDRX, there is currently no HFN broadcasted for base stations that do not support eDRX. Accordingly, in a beneficial example, the UE uses the HFN of the base stations that support eDRX for PTW calculation. Alternatively (or additionally), there could be HFN configuration/ synchronization between UE and MME 9.

This example has the benefit that significant power savings are achieved even if the base station operating the cell in which the UE is camped does not support eDRX. This example can also reduce the impact of eDRX on the base station.

Communication Device

FIG. 6 is a block diagram illustrating the main components of a communication device (UE) 3 as shown in FIG. 5. The communication device 3 may be an IoT device or another UE (e.g. a mobile (or 'cellular') telephone). The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3. However this user interface 35 may be omitted for some IoT devices.

Although not necessarily shown in FIG. 6, the UE 3 will of course have all the usual functionality of a cellular telephone network UE and this may be provided by any one or any combination of hardware, software and firmware, as appropriate.

The operation of the transceiver circuit 31 is controlled by a controller 37 in accordance with software stored in a memory 39. The software includes, among other things, an operating system 41, a communications control module 42, a discontinuous reception module 45 and a paging module 47. The memory 39 also stores a TA list 49 of the tracking areas within which the UE 3 might typically move. Software may be pre-installed in the memory 39 and/or may be downloaded via the telecommunications network 1 or from a removable data storage device (RMD), for example.

The communications control module 42 controls communications between the communication device 3 and the base station 5 and/or other communication nodes (via the base station 5).

The discontinuous reception module 45 is operable to manage DRX related functions at the UE 3 such as, for example, setting up and keeping track of DRX cycles and paging occasions, and initiating wake up to monitor for paging messages at appropriate timings. Where the UE 3 supports eDRX this module is configured to handle extended DRX specific functionality such as, for example, the setting up and management of eDRX specific parameters agreed with the MME 9 and the determination of whether eDRX is allowed based on system information received from base stations (and, is applicable, the receipt of indications that base station transparent eDRX is enabled from the MME 9).

The paging module 47 is operable to manage paging related functions at the UE 3 such as, for example, receiving and responding to paging messages broadcast by the base station 5.

Base Station

FIG. 7 is a block diagram illustrating the main components of the base station 5 shown in FIG. 5. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from the core network 7 via an appropriate core network interface 55 (such as an S1 interface).

Although not necessarily shown in FIG. 7, the base station 5 will of course have all the usual functionality of a cellular telephone network base station and this may be provided by any one or any combination of hardware, software and firmware, as appropriate.

The operation of the transceiver circuit 51 is controlled by a controller 57 in accordance with software stored in a memory 59. The software includes, among other things, an operating system 61, a communications control module 62, a discontinuous reception module control module 65 and a paging control module 66. Software may be pre-installed in the memory 59 and/or may be downloaded via the telecommunications network 1 or from a removable data storage device (RMD), for example.

The communications control module 62 controls communications with the communication devices 3 (including IoT devices).

The discontinuous reception control module 65 is operable to manage DRX related functions at the base station 5 such as, for example, setting up and keeping track of DRX cycles and paging occasions and communicating with the paging control module 66 for the sending of paging message at appropriate timings. Where the base station 5 supports eDRX this module is configured to handle extended DRX specific functionality such as, for example, the receipt and management of eDRX specific parameters (and the sending of indications of eDRX support to the MME 9 if applicable).

The paging control module 66 is operable to manage paging related functions at the base station 5 such as, for example, the receipt and interpretation of paging trigger messages from the MME 9 and controlling the sending of (and stopping the sending of) paging messages at appropriate timings based on appropriate communication with the discontinuous reception control module 65.

MME

FIG. 8 is a block diagram illustrating the main components of the mobility management entity 9 shown in FIG. 5. As shown, the mobility management entity 9 has a transceiver circuit 71 for transmitting signals to and for receiving signals from the base stations 5 (and/or communication devices connected to the base stations 5) via a base station interface 75 (e.g. an S1 interface).

The mobility management entity 9 has a controller 77 to control the operation of the mobility management entity 9. The controller 77 is associated with a memory 79. Although not necessarily shown in FIG. 8, the mobility management entity 9 will of course have all the usual functionality of a cellular telephone network mobility management entity and this may be provided by any one or any combination of hardware, software and firmware, as appropriate. Software may be pre-installed in the memory 79 and/or may be downloaded via the telecommunications network 1 or from a removable data storage device (RMD), for example.

The controller 77 is configured to control the overall operation of the mobility management entity 9 by, in this example, program instructions or software instructions stored within the memory 79. As shown, these software instructions include, among other things, an operating system 81, a communications control module 83, a discontinuous reception control module 85, and a paging triggering module 88.

The communications control module 83 is operable to control the communication between the mobility management entity 9 and the base stations 5, UEs 3 and other network entities that are connected to the mobility management entity 9.

The discontinuous reception control module 85 is operable to manage DRX related functions at the MME 9 such as, for example, setting up and keeping track of DRX cycles and communicating with the paging triggering module 88 for the sending of paging trigger messages at appropriate timings. Where the MME 9 supports eDRX this module is configured to handle extended DRX specific functionality such as, for example, the handling of requests to enable eDRX from the UE 3, negotiation/agreement of eDRX parameters and controlling timing of eDRX paging triggers in accordance with the PTW (and the sending of indications of base station transparent eDRX enablement to the UE 3 if applicable).

The paging triggering module 88 is operable to manage paging triggering functions at the MME 9 such as, for example, the receipt and interpretation downlink data notifications from the S-GW 11 and controlling the sending of paging triggering messages (including appropriate paging information) at appropriate timings based on appropriate communication with the discontinuous reception control module 85. The paging triggering module 88 is operable to, if applicable, send a message to stop paging (e.g. at the end of a PTW).

A more detailed description will now be given (with reference to FIGS. 9 to 12) of the various exemplary methods discussed above.

Different Paging Timing Depending on eDRX Support:

As explained above, in one exemplary method described herein, different paging timings can be used depending on eDRX support.

FIG. 9 is a simplified message sequence diagram illustrating an exemplary eDRX based method that can be used in the telecommunications network of FIG. 5 to facilitate use of different paging timings depending on eDRX support.

As seen in FIG. 9, a base station 5-1 that supports eDRX (in the example eNB1) provides an indication of this support (e.g. in an appropriate S1 application protocol, S1AP, message) to the MME at S910. The MME 9 thus determines, at S912, that the eDRX supporting base station 5-1 supports eDRX and maintains a record of that support. Moreover, since the MME 9 is able to determine that the eDRX supporting base station 5-1 supports eDRX is also able to determine that the MME 9 is able to determine, implicitly, that the non-eDRX supporting base station 5-2 does not support eDRX (and eDRX support cannot be guaranteed).

At S914, the UE 3 (which supports idle mode eDRX) is in the cell of the base station 5-1 that supports eDRX and therefore receives an eDRX allowed information element, in SIB1, from the base station 5-1.

At S916, the UE 3 and MME 9 engage in an Attach procedure or TAU procedure to enable use of eDRX and to negotiate associated eDRX parameters (e.g. as described in more detail with reference to FIG. 2). Specifically, the UE 3 requests use of eDRX by including one or more desired eDRX parameter(s) in an appropriate request message, sent to the MME 9, to initiate an Attach procedure or Tracking Area Update (TAU) procedure (e.g. in an Attach Request message or TAU Request message). The MME 9, which supports idle mode eDRX, agrees the desired parameters and includes the one or more (agreed) eDRX parameter(s) in an associated response (e.g. in an Attach Accept message or TAU Accept message). The Attach/TAU procedure then proceeds to completion at which point the UE 3 sends a corresponding completion message to the MME 9 (e.g. an Attach Complete message or TAU Complete message).

The MME 9 receives, at S918, a downlink data notification from the S-GW 11 for the UE 3. The MME 9, on receiving the downlink data notification considers both the UE and the base station's eDRX capability in determining how to proceed with paging. Specifically, the MME 9 identifies each base station 5-2 (belonging to the UE's TA list) that does not support eDRX (or for which eDRX support cannot be guaranteed) and each base station 5-1 (belonging to the UE's TA list) that does support eDRX.

The MME 9 triggers paging immediately, at S920, for the identified non-eDRX supporting base station(s) and sends, at S922, a paging trigger message including appropriate legacy DRX information (e.g. in the 'paging DRX IE').

Each base station that does not support eDRX and that receives the paging trigger message sent at S922 will then begin broadcasting paging messages, at S924, in accordance with the DRX information in the paging trigger message. In this example, the UE 3 has not moved to the cell of a base station that does not support eDRX and so this paging is not received at the UE 3.

The MME 9 triggers paging in accordance with eDRX, at S926, for the identified eDRX supporting base station(s). Specifically, the MME 9 sends, at S928, a paging trigger message including appropriate eDRX information (e.g. in the 'paging eDRX Information IE'), to each eDRX supporting base station (belonging to the UE's TA list), in or shortly before an associated PTW. This will, typically (but not necessarily always), take place a relatively long time after the paging trigger sent for non-eDRX supporting base station(s) and accordingly, this triggering may be made conditional on no response having been received to earlier paging attempts.

Each base station that does support eDRX and that receives the paging trigger message sent at S928 will then begin broadcasting paging messages, at S930, in accordance with the paging eDRX information in the paging trigger message. In this example, the UE 3 has not moved from the cell of the base station 5-1 that supports eDRX and so this paging is received at the UE 3 when it wakes up, at S932, in accordance with the agreed eDRX cycle.

Same Paging Timing Regardless of eDRX Support:

As explained above, in one exemplary method described herein, the same paging timings can be used regardless of eDRX support.

FIG. 10 is a simplified message sequence diagram illustrating another exemplary eDRX based method that can be used in the telecommunications network of FIG. 5 to facilitate use of the same paging timings can be used regardless of eDRX support.

As seen in FIG. 10, a base station 5-1 that supports eDRX (in the example eNB1) provides an indication of this support (e.g. in an appropriate SLAP message) to the MME 9 at S1010. The MME 9 thus determines, at S1012, that the eDRX supporting base station 5-1 supports eDRX and maintains a record of that support. Moreover, since the MME 9 is able to determine that the eDRX supporting base station 5-1 supports eDRX is also able to determine that the MME 9 is able to determine, implicitly, that the non-eDRX supporting base station 5-2 does not support eDRX (and eDRX support cannot be guaranteed).

At S1014, the UE 3 (which supports idle mode eDRX) is in the cell of the base station 5-1 that supports eDRX and therefore receives an eDRX allowed information element, in SIB1, from the base station 5-1.

At S1016, the UE 3 requests use of eDRX by including one or more desired eDRX parameter(s) in an appropriate request message, sent to the MME 9, to initiate an Attach procedure or Tracking Area Update (TAU) procedure (e.g. in an Attach Request message or TAU Request message).

As S1018, the MME 9 (which supports idle mode eDRX) identifies whether all the base stations in the UE's TA list (or TA) support eDRX.

If, as in this example, all the base stations in the UE's TA list do not support eDRX the MME 3 rejects the implicit request to enable eDRX by responding (e.g. using an Attch/ TAU Accept message) without including eDRX parameters. A UE 3 receiving such a rejection thus knows that it cannot use eDRX and can complete the attach procedure without enablement of eDRX (at S1022).

On the other hand, if all the base stations in the UE's TA list (or TA) did support eDRX, and the MME 9 agrees the desired parameters, the MME 9 includes the one or more (agreed) eDRX parameter(s) in an associated response (e.g. in an Attach Accept message or TAU Accept message) at S1020. The Attach/TAU procedure then proceeds to completion at which point the UE 3 sends a corresponding completion message to the MME 9 at S1022 (e.g. an Attach Complete message or TAU Complete message).

MME Controls the Paging Transmission Window:

As explained above, in one exemplary method described herein, the MME controls the paging transmission window.

FIG. 11 is a simplified message sequence diagram illustrating still another exemplary eDRX based method that can be used in the telecommunications network 1 of FIG. 5 to facilitate MME control of the paging transmission window.

As seen in FIG. 11, at S1102, the UE 3 (which supports idle mode eDRX) is in the cell of the base station 5-1 that supports eDRX and therefore receives an eDRX allowed information element, in SIB1, from the base station 5-1.

At S1104, when the UE 3 sends an appropriate request message, to the MME 9, to initiate an Attach procedure or Tracking Area Update (TAU) procedure (e.g. in an Attach Request message or TAU Request message) including eDRX parameters to request enablement of eDRX.

When the MME 9, receives the request message it determines that not all base stations within the UE's TA list support eDRX (e.g. based on an indication of support received from the base station as described earlier or based on one or more previous attempts by the UE to enable eDRX in a cell of a base station that do not support eDRX). At S1106 the MME 9 therefore includes, in addition to one or more eDRX parameter(s), an indication that eDRX is enabled regardless of base station support for eDRX in an associated response (e.g. in an Attach Accept message or TAU Accept message). Thus when the UE 3 receives the response from the MME 9 it knows that eDRX is enabled regardless base station support for eDRX and will thus continue to use eDRX based on the eDRX parameters received in the accept message even if it moves to a cell of a base station that does not support eDRX. The Attach/TAU procedure then proceeds to completion at which point the UE 3 sends a corresponding completion message to the MME 9 (e.g. an Attach Complete message or TAU Complete message) at S1108.

Accordingly, when the UE 3 then moves, at S1110, to a cell of a base station 5-2 that does not support eDRX the system information it receives, at S1112, does not indicate support for eDRX. Accordingly, the UE 3 will continue to wake up in accordance with eDRX for paging monitoring as indicated at 1113.

The MME 9 receives, at S1114, a downlink data notification from the S-GW 11 for the UE 3. The MME 9, on receiving the downlink data notification triggers paging in accordance with eDRX, at S1116, regardless of whether the base station(s) of the UE's TA list support eDRX. Specifically, the MME 9 sends, at S1118, a paging trigger message to each base station (belonging to the UE's TA list), in or shortly before an associated PTW. The paging trigger message, in this example, does not include eDRX information (e.g. 'paging eDRX information' IE) but instead is formatted as a legacy DRX paging message including appropriate DRX information (e.g. in the 'paging DRX IE'). It will be appreciated, however, that the paging trigger message could, in theory, be formatted as an eDRX paging message (e.g. including the 'paging eDRX information' IE).

Each base station that receives the paging trigger message sent at S1118 will then begin broadcasting paging messages, at S1122, in accordance with the DRX information in the paging trigger message. This continues until the UE 3 responds appropriately to one of the paging message (e.g. to start a RACH procedure).

In this example, if a response is not received to any of the paging messages at the end of the PTW, the MME 9 determines that the PTW has ended at S1124 and that paging should be stopped. To facilitate this, the MME 9 sends, at S1126, a message to each base station (belonging to the UE's TA list) to stop paging appropriately. It will be appreciated that this stop message may comprise an appropriately configured version of a paging trigger message or may comprise a dedicated paging stop message or the like (e.g. using a dedicated S1-AP message or the like).

FIG. 12 is a simplified message sequence diagram illustrating yet another exemplary eDRX based method that can be used in the telecommunications network 1 of FIG. 5 to facilitate MME control of the paging transmission window.

As seen in FIG. 12, at S1202, the UE 3 (which supports idle mode eDRX) is in the cell of the base station 5-1 that supports eDRX and therefore receives an eDRX allowed information element, in SIB1, from the base station 5-1.

At S1204, when the UE 3 sends an appropriate request message, to the MME 9, to initiate an Attach procedure or Tracking Area Update (TAU) procedure (e.g. in an Attach Request message or TAU Request message) including eDRX parameters to request enablement of eDRX.

When the MME 9, receives the request message it determines that not all base stations within the UE's TA list support eDRX (e.g. based on an indication of support received from the base station as described earlier or based on one or more previous attempts by the UE 3 to enable eDRX in a cell of a base station that do not support eDRX). At S1206 the MME 9 therefore includes, in addition to one or more eDRX parameter(s), an indication that eDRX is enabled regardless of base station support for eDRX in an associated response (e.g. in an Attach Accept message or TAU Accept message). Thus when the UE 3 receives the response from the MME 9 it knows that eDRX is enabled regardless base station support for eDRX and will thus continue to use eDRX based on the eDRX parameters received in the accept message even if it moves to a cell of a base station that does not support eDRX. The Attach/TAU procedure then proceeds to completion at which point the UE 3 sends a corresponding completion message to the MME 9 (e.g. an Attach Complete message or TAU Complete message) at S1208.

Accordingly, when the UE 3 then moves, at S1210, to a cell of a base station 5-2 that does not support eDRX the system information it receives, at S1212, does not indicate support for eDRX. Accordingly, the UE 3 will continue to wake up in accordance with eDRX for paging monitoring as indicated at 1213.

The MME 9 receives, at S1214, a downlink data notification from the S-GW 11 for the UE 3. The MME 9, on receiving the downlink data notification triggers paging in accordance with eDRX, at S1216, regardless of whether the base station(s) of the UE's TA list support eDRX. Specifically, the MME 9 sends, at S1218, a paging trigger message to each base station (belonging to the UE's TA list), in or shortly before an associated PTW. The paging trigger message, in this example, does not include eDRX information (e.g. 'paging eDRX information' IE) but instead is formatted as a legacy DRX paging message including appropriate DRX information (e.g. in the 'paging DRX IE'). It will be appreciated, however, that the paging trigger message could, in theory, be formatted as an eDRX paging message (e.g. including the 'paging eDRX information' IE).

Each base station that receives the paging trigger message sent at S1218 will then begin broadcasting paging messages, at S1222, in accordance with the DRX information in the paging trigger message. This will continue until the UE 3 responds appropriately to one of the paging message (e.g. to start a RACH procedure).

In this example, however, a timer is configured at each base station for timing the PTW. The length of this timer may be appropriately configured by the paging trigger message and/or may be determined based on an appropriate formula based on information received and/or stored at the base station. Each base station starts the timer, at S1220, when it starts sending pages messages and, if paging is not terminated following an appropriate response from the UE 3, stops sending paging messages, at S1224, when the timer expires. It will be appreciated that the timer could be implemented by setting a maximum number of times a paging transmission should be repeated over the air interface and stopping transmission when the number of repetitions has been reached.

Modifications and Alternatives

Detailed example embodiments have been described above. As those skilled in the art will appreciate, a number of modifications and alternatives can be made to the above embodiments whilst still benefiting from the inventions embodied therein.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above example embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the example embodiments described above, the base station and the communication device each include transceiver circuitry. Typically, this circuitry will be formed by dedicated hardware circuits. However, in some example embodiments, part of the transceiver circuit may be implemented as software run by the corresponding controller.

In the above example embodiments, a number of software modules were described. As those skilled in the art will appreciate, the software modules may be provided in compiled or un-compiled form and may be supplied to the MME, base station or the communication device as a signal over a computer network, or on a recording medium. Further, the functionality performed by part or all of this software may be performed using one or more dedicated hardware circuits.

For example, functionality and/or modules described herein may be implemented using one or computer processing apparatus having one or more hardware computer processors programmed using appropriate software instructions to provide the required functionality (e.g. one or more computer processors forming part of the controllers described with reference to the FIGS. 6 to 8). It will be further appreciated that all or part of these functions may be implemented in hardware as dedicated circuitry for example using one or more dedicated integrated circuits such as an application specific integrated circuit (ASIC) or the like.

It will be appreciated that the controllers referred to in the description of the UE and base station (i.e. with reference to FIGS. 6 to 8) may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

It will be appreciated that whilst, in above described examples, the base station(s) are described as being configured to notify the MME of their capability to support eDRX. The MME may, alternatively (or additionally) be informed by an Operations, Administration, and Maintenance (OAM) function of the eDRX capability of each base station (or each eDRX supporting base station). This may be done at the granularity of the base stations (e.g. per eNB) or of the TAs (e.g. all eNBs within a given TA support/do not support eDRX).

Moreover, in a beneficial modification/alternative, the MME may take the eDRX capability of the base stations into account when configuring the TA list of a particular UE. For example, the MME may communicate with a given UE to configure the UE's TA list to only include TA's in which all base stations support eDRX. Similarly, the MME may communicate with a given UE to configure an eDRX supporting TA list for TAs comprising eDRX supporting base stations and, separately, a non-eDRX supporting TA list for TAs comprising non-eDRX supporting base stations. This possibility also has the benefit that the same paging time may be used among all base stations albeit at the expense of additional MME features for TA list configuration purposes.

It will be appreciated that whilst, in above described examples, the MME receives an explicit notification, from the eDRX supporting base station, that the eDRX supporting base station. It will be appreciated that alternatively (or additionally) the non-eDRX supporting base station may be configured to provide, to the MME 9, an explicit notification that the non-eDRX supporting base station does not support eDRX. Similarly, the MME may alternatively (or additionally) be able to determine that the non-eDRX supporting base station does not support eDRX and maintain a record of that lack of support.

It will be appreciated that, in the procedure of FIG. 10, if all the base stations in the UE's TA list do not support eDRX the MME 3 could rejects the Attach/TAU request at using an appropriate rejection message (e.g. using an Attach Reject message or TAU Reject message as appropriate). Such a rejection message could include, for example, an IE identifying the cause of the rejection to be a lack of support for eDRX. A UE receiving such a rejection may thus engage in a new Attach/TAU procedure which does not request enablement of eDRX.

In one example there may be provided a core network communication node for a cellular communication system, the core network communication node comprising: a controller and a transceiver; wherein the controller is configured: to maintain information identifying at least one tracking area comprising a plurality of communication apparatus that each respectively operates at least one cell of the cellular communication system; to control the transceiver to receive at least one indication that at least one communication apparatus of the at least one tracking area of the cellular communication system supports extended discontinuous reception, eDRX; to determine that paging is required for a communication device and that the communication device may be located in a cell of a communication apparatus of the at least one tracking area; to trigger paging of the communication device in accordance with discontinuous reception, DRX, information that is not specific to eDRX via communication apparatus of the at least one tracking area for which an indication of support for eDRX has not been received; and to trigger paging of the communication device in accordance with eDRX specific information via each communication apparatus of the at least one tracking area for which an indication of support for eDRX has been received.

The controller may be configured to determine, before triggering the paging of the communication device in accordance with eDRX specific information, whether or not the communication device has responded to earlier paging of the communication device in accordance with DRX information that is not specific to eDRX.

The controller may be configured to trigger the paging of the communication device in accordance with eDRX specific information when it has determined that the communication device has not responded to the earlier paging of the communication device.

The controller may be configured to not trigger the paging of the communication device in accordance with eDRX specific information when it has determined that the communication device has responded to the earlier paging of the communication device.

In one example there may be provided a core network communication node for a cellular communication system, the core network communication node comprising: a controller and a transceiver; wherein the controller is configured: to maintain information identifying at least one tracking area comprising a plurality of communication apparatus that each respectively operates at least one cell of the cellular communication system; to control the transceiver to receive at least one indication that at least one communication apparatus of the at least one tracking area of the cellular communication system supports extended discontinuous reception, eDRX; to receive, from a communication device located in a cell of a communication apparatus of the at least one tracking area, a request message comprising information for enabling eDRX; to determine if all the plurality of communication apparatus of the at least one tracking area have been indicated to support eDRX; to control the transceiver to transmit a message to the communication device rejecting eDRX enablement when the controller determines that not all the plurality of communication apparatus of the at least one tracking area have been indicated to support eDRX; and to control the transceiver to transmit an message to the communication device accepting eDRX enablement when the controller determines that all the plurality of communication apparatus of the at least one tracking area have been indicated to support eDRX.

The request message and the message accepting (or rejecting message) eDRX enablement may respectively be an attach request message and an attach accept message (or attach reject message) forming part of an attach procedure.

The request message and the message accepting (or rejecting message) eDRX enablement may respectively be a tracking area update, TAU, request message and a TAU accept message (or TAU reject message) forming part of a TAU procedure.

The at least one indication that at least one communication apparatus of the at least one tracking area of the cellular communication system supports eDRX may comprise an indication that all communication apparatus of the at least one tracking area support eDRX.

The at least one indication that at least one communication apparatus of the at least one tracking area of the cellular communication system supports eDRX may comprise a respective indication for each communication apparatus that supports eDRX.

The controller may be configured to control the transceiver to receive the at least one indication that at least one communication apparatus of the at least one tracking area of the cellular communication system supports eDRX from the at least one communication apparatus (e.g. over an S1 interface, e.g in an S1 application protocol, S1AP, message).

The controller may be configured to control the transceiver to receive the at least one indication that at least one communication apparatus of the at least one tracking area of the cellular communication system supports eDRX from an operations, administration, and maintenance, OAM, function.

In one example there may be is provided communication apparatus for operating at least one cell of a cellular communication system, the communication apparatus comprising: a controller and a transceiver; wherein the controller is configured: to provide support for the use of extended discontinuous reception, eDRX, by a communication device in the cell; and to control the transceiver to provide an indication that the communication apparatus supports eDRX, to a core network communication node.

The indication may be provided over an S1 interface (e.g in an S1 application protocol, S1AP, message).

In one example there may be provided a core network communication node for a cellular communication system, the core network communication node comprising: a controller and a transceiver; wherein the controller is configured: to maintain information identifying at least one tracking area comprising a plurality of communication apparatus that each respectively operates at least one cell of the cellular communication system; to control the transceiver to send, to a communication device located in a cell of a communication apparatus of the at least one tracking area, an indication that extended discontinuous reception, eDRX, may be used regardless of whether the communication apparatus that operates the cell in which the communication device is located supports eDRX; to control the transceiver to communicate, with the communication device, to enable use of eDRX at the communication device in accordance with an eDRX configuration; to determine that paging is required for the communication device; and to trigger paging of the communication device, via the plurality of communication apparatus of the at least one tracking area in, or just prior to, a paging transmission window, PTW, in accordance with the eDRX configuration.

The controller may be configured, when triggering the paging, to trigger paging based on discontinuous reception, DRX, information that is not specific to eDRX.

The indication that extended discontinuous reception, eDRX, may be used may be provided in a non-access stratum, NAS, message.

The indication that extended discontinuous reception, eDRX, may be used may be provided by including eDRX parameters in an accept message (e.g. an attach or tracking area update accept message) sent responsive to a request message that does not request eDRX enablement (e.g. does not include eDRX parameters).

The controller may be further configured to trigger a stop to the paging at the end of the PTW.

In one example there may be provided a communication device for a cellular communication system, the communication device comprising: a controller and a transceiver; wherein the controller is configured: to control the transceiver to receive, from a core network communication node, an indication that extended discontinuous reception, eDRX, may be used regardless of whether a communication apparatus that operates a cell in which the communication device is located supports eDRX; to control the transceiver to communicate, with the core network communication node, to enable use of eDRX at the communication device in accordance with an eDRX configuration regardless of whether the communication apparatus that operates the cell in which the communication device is located supports eDRX; and to control the transceiver to wake up to monitor for paging messages during a paging transmission window, PTW, in accordance with the eDRX configuration.

In one example there may be provided communication apparatus for operating at least one cell of a cellular communication system, the communication apparatus comprising: a controller and a transceiver; wherein the controller is configured: to control the transceiver to receive, from a core network communication node, a message to trigger paging of a communication device in, or just prior to, a paging transmission window, PTW, in accordance with an eDRX configuration; to control the transceiver to send paging messages in the cell in accordance with discontinuous reception, DRX, information that is not specific to eDRX; and to stop the transceiver from sending the paging messages in the cell at the end of the PTW.

The controller may be configured to stop the transceiver from sending the paging messages in the cell at the end of the PTW based on a timer implemented at the communication apparatus.

The controller may be configured to stop the transceiver from sending the paging messages in the cell at the end of the PTW based on a message received from the core network communication node.

Various other modifications will be apparent to those skilled in the art and will not be described in further detail here.

The invention claimed is:

1. A core network communication node for a cellular communication system, the core network communication node comprising:
 a controller and a transceiver,
 wherein the controller is configured:
  to maintain information identifying at least one tracking area comprising a plurality of communication apparatuses that each respectively operates at least one cell of the cellular communication system;
  to control the transceiver to receive at least one indication that at least one of the communication apparatuses of the at least one tracking area of the cellular communication system supports extended discontinuous reception, eDRX;
  to determine that paging is required for a communication device and that the communication device may be located in a cell of one of the communication apparatuses of the at least one tracking area;
  to trigger paging of the communication device in accordance with discontinuous reception, DRX, information that is not specific to eDRX via one of the communication apparatuses of the at least one tracking area for which an indication of support for eDRX has not been received; and
  to trigger paging of the communication device in accordance with eDRX specific information via each of the communication apparatuses of the at least one tracking area for which an indication of support for eDRX has been received.

2. A core network communication node according to claim 1, wherein the controller is configured to determine, before triggering the paging of the communication device in accordance with eDRX specific information, whether or not the communication device has responded to earlier paging of the communication device in accordance with DRX information that is not specific to eDRX.

3. A core network communication node according to claim 2, wherein the controller is configured to trigger the paging of the communication device in accordance with eDRX specific information when it has determined that the communication device has not responded to the earlier paging of the communication device.

4. A core network communication node according to claim 2, wherein the controller is configured to not trigger the paging of the communication device in accordance with eDRX specific information when it has determined that the communication device has responded to the earlier paging of the communication device.

5. A core network communication node according to claim 1, wherein the at least one indication that at least one of the communication apparatuses of the at least one tracking area of the cellular communication system supports eDRX comprises an indication that all of the communication apparatuses of the at least one tracking area support eDRX.

6. A core network communication node according to claim 1, wherein the at least one indication that at least one of the communication apparatuses of the at least one tracking area of the cellular communication system supports eDRX comprises a respective indication for each of the communication apparatuses that supports eDRX.

7. A core network communication node according to claim 6, wherein the controller is configured to control the transceiver to receive the at least one indication that at least one of the communication apparatuses of the at least one tracking area of the cellular communication system supports eDRX from the at least one of the communication apparatuses.

8. A core network communication node according to claim 1, wherein the controller is configured to control the transceiver to receive the at least one indication that at least one of the communication apparatuses of the at least one tracking area of the cellular communication system supports eDRX from an operations, administration, and maintenance, OAM, function.

9. A core network communication node for a cellular communication system, the core network communication node comprising:
 a controller and a transceiver;
 wherein the controller is configured:
  to maintain information identifying at least one tracking area comprising a plurality of communication apparatuses that each respectively operates at least one cell of the cellular communication system;
  to control the transceiver to receive at least one indication that at least one of the communication apparatuses of the at least one tracking area of the cellular communication system supports extended discontinuous reception, eDRX;
  to receive, from a communication device located in a cell of one of the communication apparatuses of the at least one tracking area, a request message comprising information for enabling eDRX;
  to determine if all the plurality of communication apparatuses of the at least one tracking area have been indicated to support eDRX;
  to control the transceiver to transmit a message to the communication device rejecting eDRX enablement when the controller determines that not all the plurality of communication apparatuses of the at least one tracking area have been indicated to support eDRX; and
  to control the transceiver to transmit a message to the communication device accepting eDRX enablement when the controller determines that all the plurality of communication apparatuses of the at least one tracking area have been indicated to support eDRX.

10. A core network communication node according to claim 9, wherein the request message and the message accepting (or rejecting) eDRX enablement are respectively an attach request message and an attach accept message (or attach reject message) forming part of an attach procedure.

11. A core network communication node according to claim 9, wherein the request message and the message accepting (or rejecting) eDRX enablement are respectively a tracking area update, TAU, request message and a TAU accept message (or TAU reject message) forming part of a TAU procedure.

12. A communication apparatus for operating at least one cell of a cellular communication system, the communication apparatus comprising:
a controller and a transceiver;
wherein the controller is configured:
to provide support for use of extended discontinuous reception, eDRX, by a communication device in the cell;
to control the transceiver to provide an indication that the communication apparatus supports eDRX, to a core network communication node;
to control the transceiver to receive, from the core network communication node, a message to trigger paging of the communication device, wherein the message includes discontinuous reception, DRX, information and does not include eDRX information;
to control the transceiver to send, to the communication device, at least one paging message in the cell in accordance with the DRX information and to configure a predetermined timer; and
to stop the transceiver from sending the at least one paging message in the cell if the communication device responds to the at least one paging message and the predetermined timer expires.

13. A core network communication node for a cellular communication system, the core network communication node comprising:
a controller and a transceiver;
wherein the controller is configured:
to maintain information identifying at least one tracking area comprising a plurality of communication apparatuses that each respectively operates at least one cell of the cellular communication system;
to control the transceiver to send, to a communication device located in a cell of one of the communication apparatuses of the at least one tracking area, an indication that extended discontinuous reception, eDRX, may be used regardless of whether the one of the communication apparatuses that operates the cell in which the communication device is located supports eDRX;
to control the transceiver to communicate, with the communication device, to enable use of eDRX at the communication device in accordance with an eDRX configuration;
to determine that paging is required for the communication device; and
to trigger paging of the communication device, via the plurality of communication apparatuses of the at least one tracking area in, or just prior to, a paging transmission window, PTW, in accordance with the eDRX configuration.

14. A core network communication node according to claim 13, wherein the controller is configured, when triggering the paging, to trigger paging based on discontinuous reception, DRX, information that is not specific to eDRX.

15. A core network communication node according to claim 13, wherein the indication that extended discontinuous reception, eDRX, may be used is provided in a non-access stratum, NAS, message.

16. A core network communication node according to claim 13, wherein the indication that extended discontinuous reception, eDRX, may be used is provided by including eDRX parameters in an accept message sent responsive to a request message that does not request eDRX enablement.

17. A core network communication node according to claim 13, wherein the controller is further configured to trigger a stop to the paging at the end of the PTW.

18. A communication device for a cellular communication system, the communication device comprising:
a controller and a transceiver;
wherein the controller is configured:
to control the transceiver to receive, from a core network communication node, an indication that extended discontinuous reception, eDRX, may be used regardless of whether a communication apparatus that operates a cell in which the communication device is located supports eDRX;
to control the transceiver to communicate, with the core network communication node, to enable use of eDRX at the communication device in accordance with an eDRX configuration regardless of whether the communication apparatus that operates the cell in which the communication device is located supports eDRX; and
to control the transceiver to wake up to monitor for paging messages during a paging transmission window, PTW, in accordance with the eDRX configuration.

19. A communication apparatus for operating at least one cell of a cellular communication system, the communication apparatus comprising:
a controller and a transceiver;
wherein the controller is configured:
to control the transceiver to receive, from a core network communication node, a message to trigger paging of a communication device in, or just prior to, a paging transmission window, PTW, in accordance with an eDRX configuration, wherein the message includes discontinuous reception, DRX, information and does not include eDRX information;
to control the transceiver to send paging messages in the cell in accordance with the DRX information included in the message; and
to stop the transceiver from sending the paging messages in the cell at the end of the PTW.

20. A communication apparatus according to claim 19, wherein the controller is configured to stop the transceiver from sending the paging messages in the cell at the end of the PTW based on a timer implemented at the communication apparatus.

21. A communication apparatus according to claim 19, wherein the controller is configured to stop the transceiver from sending the paging messages in the cell at the end of the PTW based on a message received from the core network communication node.

22. A method performed by a core network communication node in a cellular communication system, the method comprising:
maintaining information identifying at least one tracking area comprising a plurality of communication apparatuses that each respectively operates at least one cell of the cellular communication system;
receiving at least one indication that at least one of the communication apparatuses of the at least one tracking area of the cellular communication system supports extended discontinuous reception, eDRX;

determining that paging is required for a communication device and that the communication device may be located in a cell of one of the communication apparatuses of the at least one tracking area;

triggering paging of the communication device in accordance with discontinuous reception, DRX, information that is not specific to eDRX via one of the communication apparatuses of the at least one tracking area for which an indication of support for eDRX has not been received; and triggering paging of the communication device in accordance with eDRX specific information via each of the communication apparatuses of the at least one tracking area for which an indication of support for eDRX has been received.

23. A method performed by a communication apparatus that operates at least one cell of a cellular communication system, the method comprising:

providing support for the use of extended discontinuous reception, eDRX, by a communication device in the cell;

providing an indication that the communication apparatus supports eDRX, to a core network communication node;

receiving, from the core network communication node, a message to trigger paging of the communication device, wherein the message includes discontinuous reception, DRX, information and does not include eDRX information;

sending, to the communication device, at least one paging message in the cell in accordance with the DRX information and configuring a predetermined timer; and stopping the sending of the at least one paging message in the cell if the communication device responds to the at least one paging message and the predetermined timer expires.

* * * * *